(12) United States Patent
Yoon

(10) Patent No.: US 11,940,843 B2
(45) Date of Patent: Mar. 26, 2024

(54) DISPLAY DEVICE INCLUDING ROLLER

(71) Applicant: LG DISPLAY CO., LTD., Seoul (KR)

(72) Inventor: Sangwon Yoon, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/894,413

(22) Filed: Aug. 24, 2022

(65) Prior Publication Data

US 2023/0080163 A1 Mar. 16, 2023

(30) Foreign Application Priority Data

Sep. 15, 2021 (KR) .................. 10-2021-0123140

(51) Int. Cl.
*G06F 1/16* (2006.01)

(52) U.S. Cl.
CPC .................. *G06F 1/1652* (2013.01)

(58) Field of Classification Search
CPC ........... G06F 1/1652; G06F 2200/1612; G06F 1/1601
See application file for complete search history.

(56) References Cited

U.S. PATENT DOCUMENTS

| | | | | |
|---|---|---|---|---|
| 9,710,020 | B2 * | 7/2017 | Choi | G06F 1/1652 |
| 10,517,180 | B2 * | 12/2019 | Choi | B65H 16/103 |
| 2020/0205301 | A1 * | 6/2020 | Song | H05K 5/0017 |
| 2022/0317732 | A1 * | 10/2022 | Lee | H04M 1/021 |

FOREIGN PATENT DOCUMENTS

| | | | | |
|---|---|---|---|---|
| KR | 2016-0100003 | A | 8/2016 | |
| KR | 20160100003 | A * | 8/2016 | ........... G06F 1/1652 |
| KR | 10-2095262 | B1 | 3/2020 | |
| KR | 102095262 | B1 * | 3/2020 | ............ B65H 57/14 |

* cited by examiner

*Primary Examiner* — Abhishek M Rathod
*Assistant Examiner* — Keon Nmn Kim
(74) *Attorney, Agent, or Firm* — POLSINELLI PC

(57) ABSTRACT

A display device includes a display unit and a roller configured to wind or unwind the display unit, and comprising a flat portion, a first curved portion extending from the flat portion, and a second curved portion extending from the first curved portion toward the flat portion, in which a radius of curvature of the first curved portion is larger than a radius of curvature of the second curved portion, and a radius of curvature of the display unit wound around the second curved portion is larger than the radius of curvature of the second curved portion, thus the second curved portion is formed to support the display unit so that the display unit is not curved with a small radius of curvature between the first curved portion and the flat portion.

16 Claims, 18 Drawing Sheets

DISPLAY DEVICE INCLUDING ROLLER

CROSS-REFERENCE TO RELATED APPLICATION

This application claims the priority of Korean Patent Application No. 10-2021-0123140 filed on Sep. 15, 2021, which is hereby incorporated by reference in its entirety.

BACKGROUND

Field of the Disclosure

The present disclosure relates to a display device, and more particularly, to a rollable display device capable of displaying images even in a case in which the display device is rolled up.

Description of the Background

As display devices used for a monitor of a computer, a TV set, a mobile phone, and the like, there are an organic light-emitting display (OLED) configured to autonomously emit, and a liquid crystal display (LCD) that requires a separate light source.

The range of application of the display devices is diversified from the monitor of the computer and the TV set to personal mobile devices, and studies are being conducted on the display devices having wide display areas and having reduced volumes and weights.

In addition, recently, a rollable display device, which is made by forming display elements, lines, and the like on a substrate made of a flexible plastic material having flexibility and thus may display images even in a case in which the rollable display device is rolled up, has attracted attention as a next-generation display device.

SUMMARY

Accordingly, the present disclosure is to provide a display device, in which damage to the display device caused by repeated winding and unwinding processes is minimized.

The present disclosure is also to provide a display device, in which stress applied to the display device during a process of winding the display device is reduced.

The present disclosure is also to provide a display device, in which the occurrence of crack in the display panel is minimized by inhibiting the display device from being excessively bent in a boundary area between a flat portion and a first curved portion during a process of winding the display device.

The present disclosure is not limited to the above-mentioned and other features, which are not mentioned above, can be clearly understood by those skilled in the art from the following descriptions.

According to an aspect of the present disclosure, a display device includes a display unit; and a roller configured such that the display unit is wound around or unwound from the roller, the roller comprising a flat portion, a first curved portion extending from the flat portion, and a second curved portion extending from the first curved portion toward the flat portion, in which a radius of curvature of the first curved portion is larger than a radius of curvature of the second curved portion, and a radius of curvature of the display unit wound around the second curved portion is larger than the radius of curvature of the second curved portion. Therefore, the second curved portion is formed to support the display unit so that the display unit is not curved with a small radius of curvature between the first curved portion and the flat portion, which makes it possible to minimize damage to the display device caused by excessive bending.

According to another aspect of the present disclosure, a display device includes a display panel; and a roller configured such that the display panel is wound around or unwound from the roller, the roller comprising a flat portion, a first curved portion, and a second curved portion disposed between the first curved portion and the flat portion and having a smaller radius of curvature than the first curved portion, in which a part of the second curved portion further protrudes outward than one surface of the flat portion. Therefore, the second curved portion is formed to support the display panel between the first curved portion and the flat portion, which makes it possible to minimize cracks and defects in the display panel.

Other detailed matters of the exemplary aspects are included in the detailed description and the drawings.

In the present disclosure, one or more curved portions are further disposed between the flat portion and the first curved portion, such that the display panel may be supported so that the display panel is wound while having a large radius of curvature in the boundary area between the flat portion and the first curved portion, thereby solving the problem of cracks and defects.

In the present disclosure, the plurality of curved portions is formed to allow the display panel to be gently curved around the roller, which makes it possible to minimize a situation in which the display panel wound around the roller is excessively bent and damaged.

In the present disclosure, it is possible to minimize damage to the pad area by dispersing stress concentrated in a region adjacent to the pad area of the display panel in the boundary area between the flat portion and the curved portion.

The effects according to the present disclosure are not limited to the contents exemplified above, and more various effects are included in the present specification.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Figure 1A:
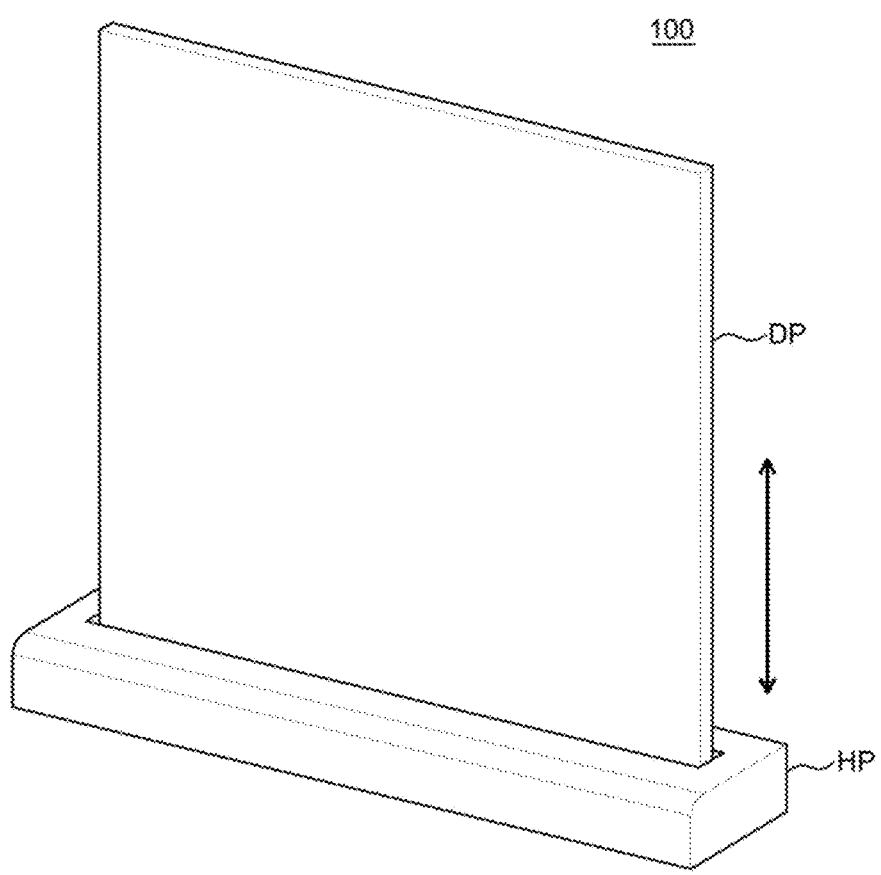
FIGS. 1A and 1B are perspective view of a display device according to an aspect of the present disclosure.

Advantages and characteristics of the present disclosure and a method of achieving the advantages and characteristics will be clear by referring to exemplary aspects described below in detail together with the accompanying drawings. However, the present disclosure is not limited to the exemplary aspects disclosed herein but will be implemented in various forms. The exemplary aspects are provided by way of example only so that those skilled in the art can fully understand the disclosures of the present disclosure and the scope of the present disclosure. Therefore, the present disclosure will be defined only by the scope of the appended claims.

The shapes, sizes, ratios, angles, numbers, and the like illustrated in the accompanying drawings for describing the exemplary aspects of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly".

When an element or layer is disposed "on" another element or layer, another layer or another element may be interposed directly on the other element or therebetween.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various aspects of the present disclosure can be partially or entirely adhered to or combined with each other and can be interlocked and operated in technically various ways, and the aspects can be carried out independently of or in association with each other.

Hereinafter, a display device according to exemplary aspects of the present disclosure will be described in detail with reference to accompanying drawings.

A rollable display device refers to a display device capable of displaying images even in a case in which the rollable display device is rolled up. The rollable display device may have higher flexibility than a general display device in the related art. A shape of the rollable display device may be freely changed depending on whether the rollable display device is used. Specifically, when the rollable display device is not used, the rollable display device may be rolled up and stored with a reduced volume. On the contrary, when the rollable display device is used, the rolled-up rollable display device may be unfolded again and used.

Figure 1B:
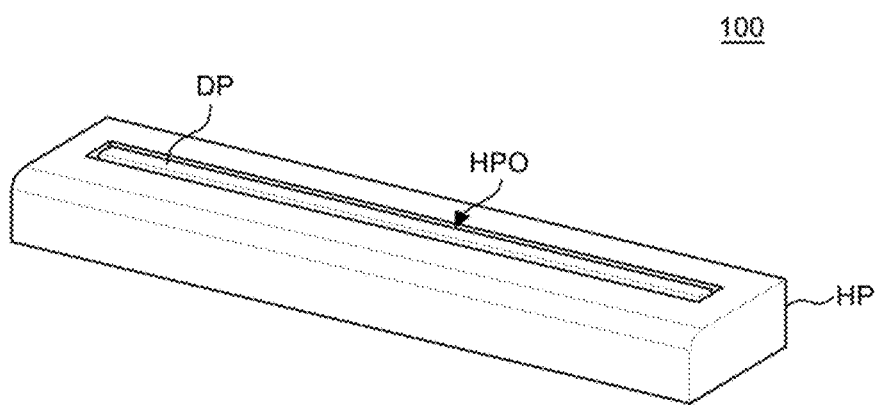

FIGS. 1A and 1B are perspective view of a display device according to an aspect of the present disclosure. Referring to FIGS. 1A and 1B, a display device 100 according to an aspect of the present disclosure includes a display unit DP and a housing unit HP.

The display unit DP is configured to display images to a user. For example, display elements and circuits, lines, and components for operating the display elements may be disposed on the display unit DP. In this case, since the display device 100 according to the aspect of the present disclosure is a rollable display device, the display unit DP may be configured to be wound or unwound. For example, the display unit DP may include a display panel having flexibility so as to be wound or unwound, and a first cover. The display unit DP will be described below in more detail with reference to FIGS. 4A to 5.

The housing unit HP is a casing capable of accommodating the display unit DP. The housing unit HP may have an opening portion HPO through which the display unit DP may move to the outside or the inside of the housing unit HP.

Meanwhile, the display unit DP of the display device 100 may switch from a fully unwound state illustrated in FIG. 1A to a fully wound state illustrated in FIG. 1B or switch from the fully wound state to the fully unwound state.

A driving unit is disposed to wind or unwind the display unit DP to switch the display unit DP to the fully unwound state or the fully wound state.

Figure 2:
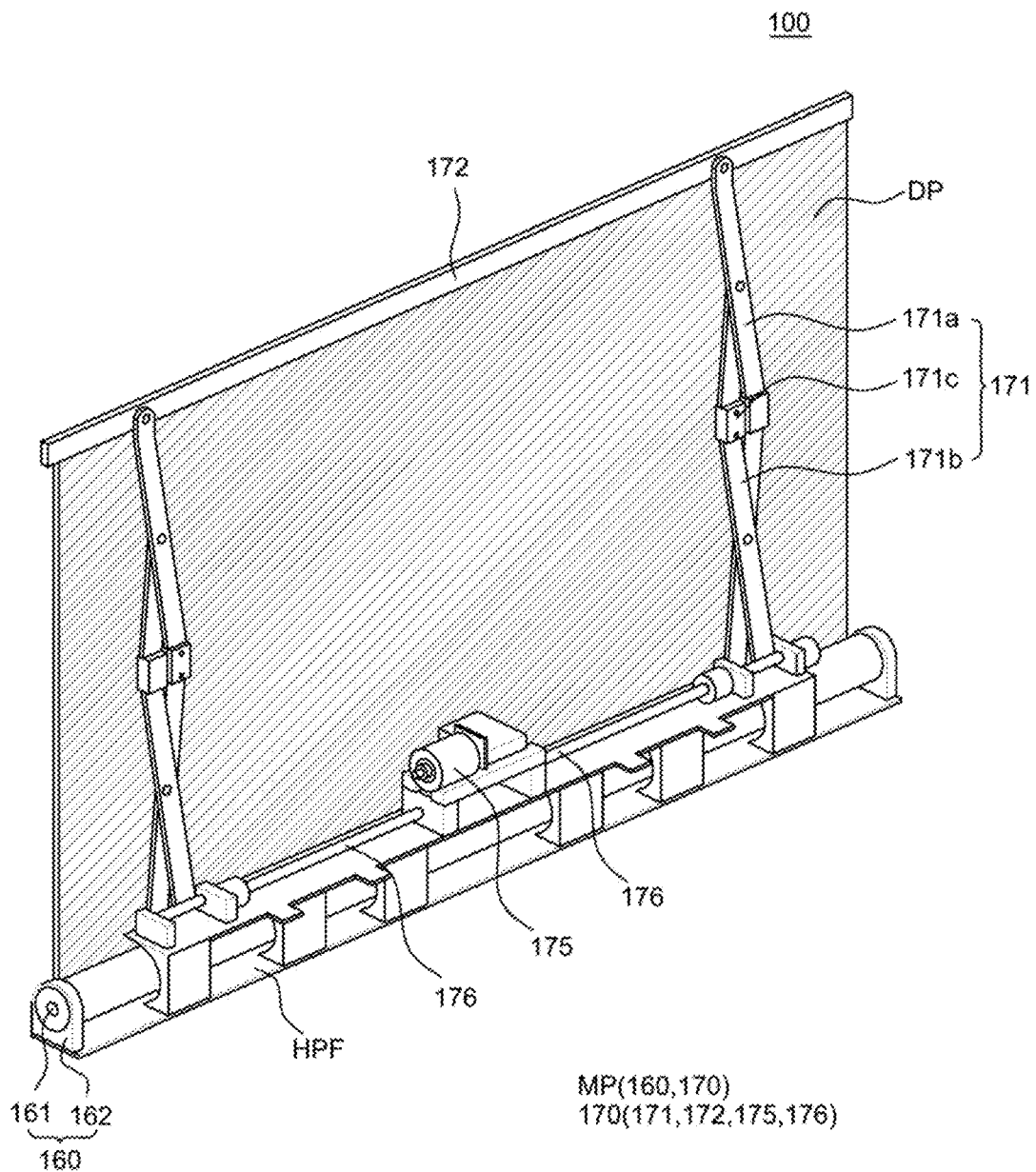
FIG. 2 is a perspective view of the display device according to the aspect of the present disclosure.
Figure 3:
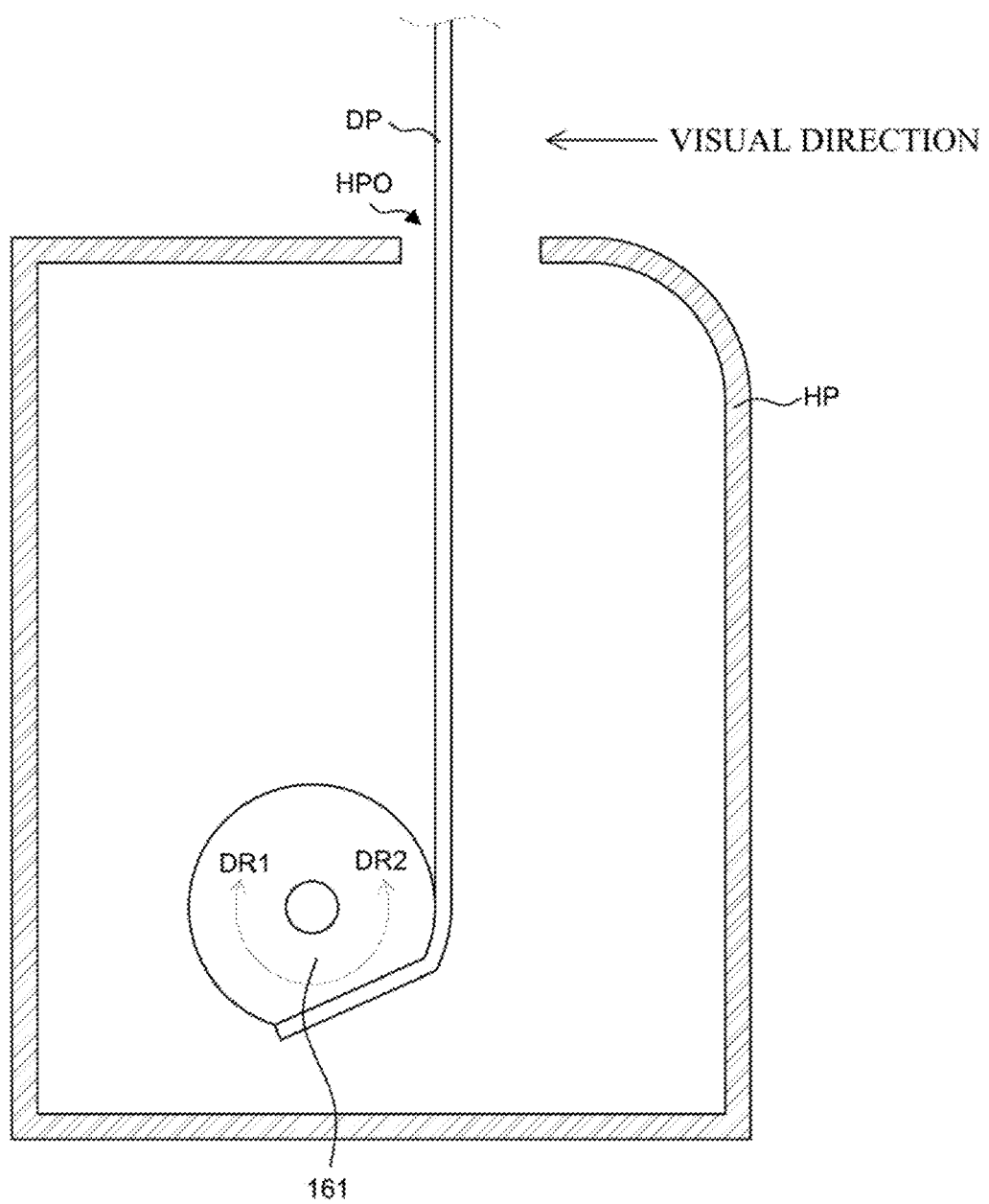
FIG. 3 is a schematic cross-sectional view of the display device according to the aspect of the present disclosure.

FIG. 2 is a perspective view of the display device according to the aspect of the present disclosure. FIG. 3 is a schematic cross-sectional view of the display device according to the aspect of the present disclosure. FIG. 3 is a schematic cross-sectional view for explaining a roller 161 and the display unit DP of the display device 100 according to the aspect of the present disclosure. For the convenience of description, FIG. 3 illustrates only the housing unit HP, the roller 161, and the display unit DP.

First, referring to FIG. 2, the driving unit MP includes a roller unit 160 and a lifting unit 170.

The roller unit 160 winds or unwinds the display unit DP fixed to the roller unit 160 while rotating clockwise or counterclockwise. The roller unit 160 includes the roller 161 and roller support portions 162.

The roller 161 refers to a member around which the display unit DP is wound. For example, the roller 161 may have a cylindrical shape. A lower edge of the display unit DP may be fixed to the roller 161. When the roller 161 rotates, the display unit DP having the lower edge fixed to the roller 161 may be wound around the roller 161. In contrast, when the roller 161 rotates in the reverse direction, the display unit DP wound around the roller 161 may be unwound from the roller 161.

Referring to FIG. 3, the roller 161 may have a cylindrical shape in which at least a portion of an outer peripheral surface of the roller 161 has a flat surface, and the remaining portion of the outer peripheral surface has a curved surface. The roller 161 may have a cylindrical shape as a whole, but a part of the roller 161 may have a flat surface. That is, a portion of the outer peripheral surface of the roller 161 is flat, and the remaining portion of the outer peripheral surface is curved. For example, the roller 161 may have one or more curved portions and a flat portion. The flat portion of the roller 161 may be a portion on which a printed circuit board and a plurality of flexible films of the display unit DP are seated. However, for the convenience of description, FIG. 3 illustrates that the roller 161 has a single curved portion and a single flat portion. However, the number of curved portions and the number of flat portions are not limited thereto. This configuration will be described below with reference to FIGS. 6 and 7.

Referring back to FIG. 2, the roller support portions 162 support the rollers 161 at two opposite sides of the roller 161. Specifically, the roller support portion 162 is disposed on a bottom surface HPF of the housing unit HP. Further, lateral surfaces of upper ends of the roller support portions 162 are coupled to two opposite ends of the roller 161. Therefore, the roller support portions 162 may support the roller 161 so that the roller 161 is spaced apart from the bottom surface HPF of the housing unit HP. In this case, the roller 161 may be rotatably coupled to the roller support portions 162.

The lifting unit 170 moves the display unit DP in an upward/downward direction in conjunction with an operation of the roller unit 160. The lifting unit 170 includes link units 171, a head bar 172, a motor 175, and rotary units 176.

The link unit 171 of the lifting unit 170 includes a plurality of links 171a and 171b, and a hinge 171c configured to connect the plurality of links 171a and 171b. Specifically, the plurality of links 171a and 171b includes a first link 171a and a second link 171b. The first link 171a and the second link 171b are rotatably fastened by means of the hinge 171c while intersecting each other in a scissors shape. The link unit 171 may include the plurality of links that intersect each other. However, the number of links is not limited. The link unit 171 may include a single link. Therefore, when the link unit 171 moves in the upward/downward direction, the plurality of links may rotate in a direction toward or away from one another. The link unit 171 may include the plurality of links that intersect each other. However, the present disclosure is not limited thereto. The link unit 171 may include a single link that does not intersect.

The head bar 172 of the lifting unit 170 is fixed to an uppermost end of the display unit DP. The head bar 172 may be connected to the link unit 171 and move the display unit DP in the upward/downward direction by means of the rotations of the plurality of links of the link unit 171. That is, the display unit DP may be moved in the upward/downward direction by the head bar 172 and the link unit 171.

The head bar 172 covers a part of the display unit DP adjacent to the edge of the uppermost end of the display unit DP so as not to an image deployed on a front surface of the display unit DP. The display unit DP and the head bar 172 may be fixed by a screw, but the present disclosure is not limited thereto.

The motor 175 may be connected to a power generator such as a separate external power source or an embedded battery and supplied with power. The motor 175 generates a rotational force and provides driving power to the rotary unit 176.

The rotary unit 176 is connected to the motor 175 and configured to convert a rotational motion provided from the motor 175 into a rectilinear reciprocating motion. That is, the rotational motion of the motor 175 may be converted into the rectilinear reciprocating motion of a structure fixed to the rotary unit 176. For example, the rotary unit 176 may be implemented as a ball-screw mechanism including a shaft and a nut fastened to the shaft. However, the present disclosure is not limited thereto.

The motor 175 and the rotary unit 176 may operate in conjunction with the link unit 171, thereby moving the display unit DP upward or downward. The link unit 171 may have a link structure and be repeatedly folded or unfolded by receiving the driving power from the motor 175 and the rotary unit 176.

Specifically, to wind the display unit DP, the motor 175 may operate, and the structure of the rotary unit 176 may rectilinearly move. That is, a part of the rotary unit 176 to which one end of the second link 171b is connected may rectilinearly move. Therefore, one end of the second link 171b may move toward the motor 175, and the plurality of links is folded, such that a height of the link unit 171 may decrease. In addition, during the process of folding the plurality of links, the head bar 172 connected to the first link 171a also moves downward, and one end of the display unit DP connected to the head bar 172 also moves downward.

To unwind the display unit DP, the motor 175 may operate, and the structure of the rotary unit 176 may rectilinearly move. That is, a part of the rotary unit 176 to which one end of the second link 171b is connected may rectilinearly move. Therefore, one end of the second link 171b may move away from the motor 175, and the plurality of links may be unfolded, such that the height of the link unit 171 may increase. In addition, during the process of unfolding the plurality of links, the head bar 172 connected to the first link 171a also moves upward, and the display unit DP connected to the head bar 172 also moves upward.

Therefore, when the display unit DP is fully wound around the roller 161, the link unit 171 of the lifting unit 170 is kept folded. That is, when the display unit DP is fully wound around the roller 161, the lifting unit 170 may have the lowest height. In contrast, when the display unit DP is fully unwound, the link unit 171 of the lifting unit 170 is kept unfolded. That is, when the display unit DP is fully unwound, the lifting unit 170 may have the highest height.

Meanwhile, to wind the display unit DP, the roller 161 may rotate, and the display unit DP may be wound around the roller 161. Referring to FIG. 3, for example, a lower edge of the display unit DP is connected to the roller 161. Further, when the roller 161 rotates in a first direction DR1, i.e., clockwise, the display unit DP may be wound so that a rear surface of the display unit DP in close contact with the surface of the roller 161.

To unwind the display unit DP, the roller 161 may rotate, and the display unit DP may be unwound from the roller 161. Referring to FIG. 3, for example, when the roller 161 rotates in a second direction DR2, i.e., counterclockwise, the display unit DP wound around the roller 161 may be unwound from the roller 161 and disposed outside the housing unit HP.

In some aspects, the driving unit MP having other structures other than the above-mentioned driving unit MP may be applied to the display device 100. That is, the components of the roller unit 160 and the lifting unit 170 may be changed, some of the components may be eliminated, or other components may be added as long as the components may wind and unwind the display unit DP.

Figure 4A:
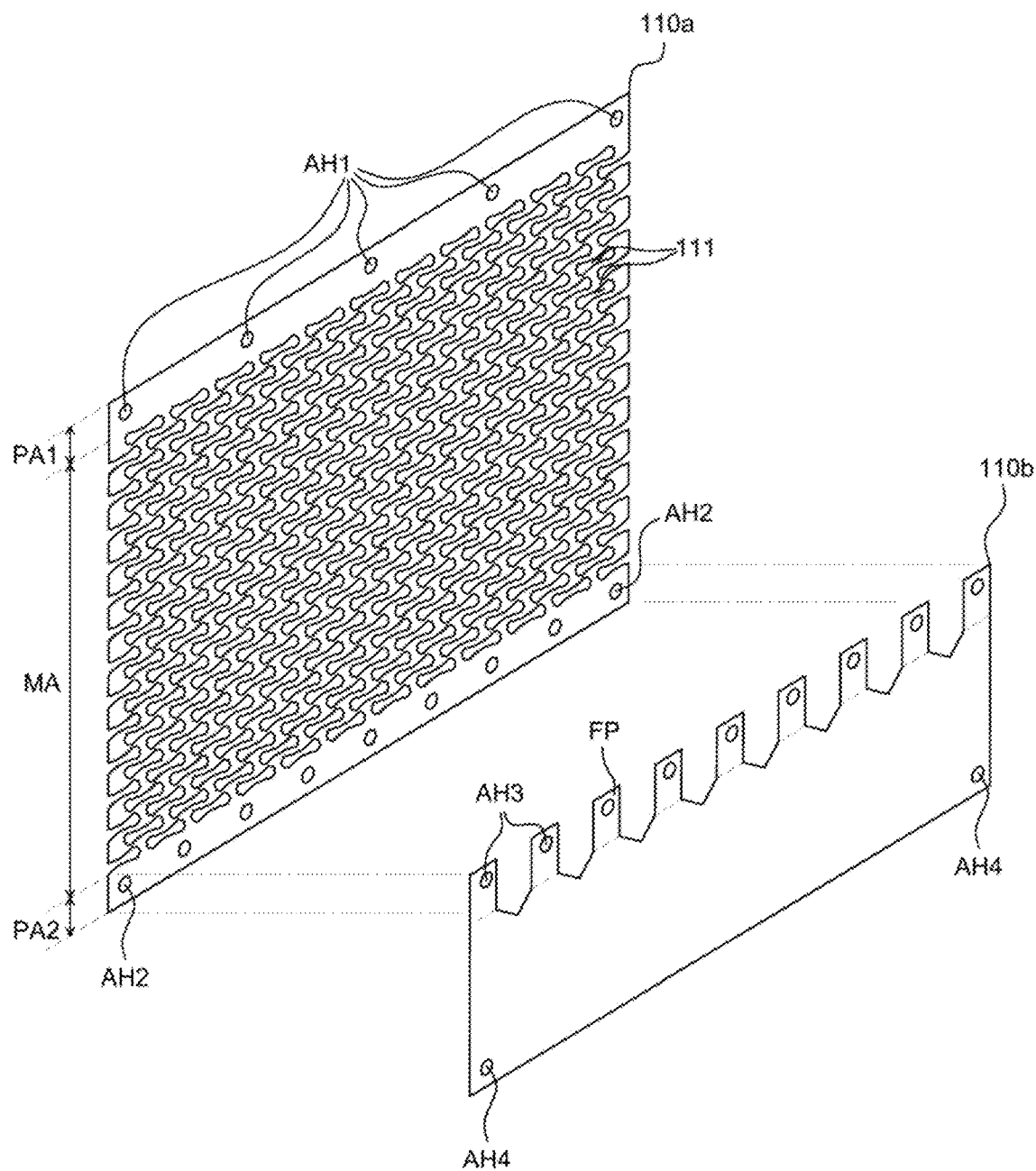
FIG. 4A is an exploded perspective view for explaining a first cover and a second cover of the display device according to the aspect of the present disclosure.
Figure 4B:
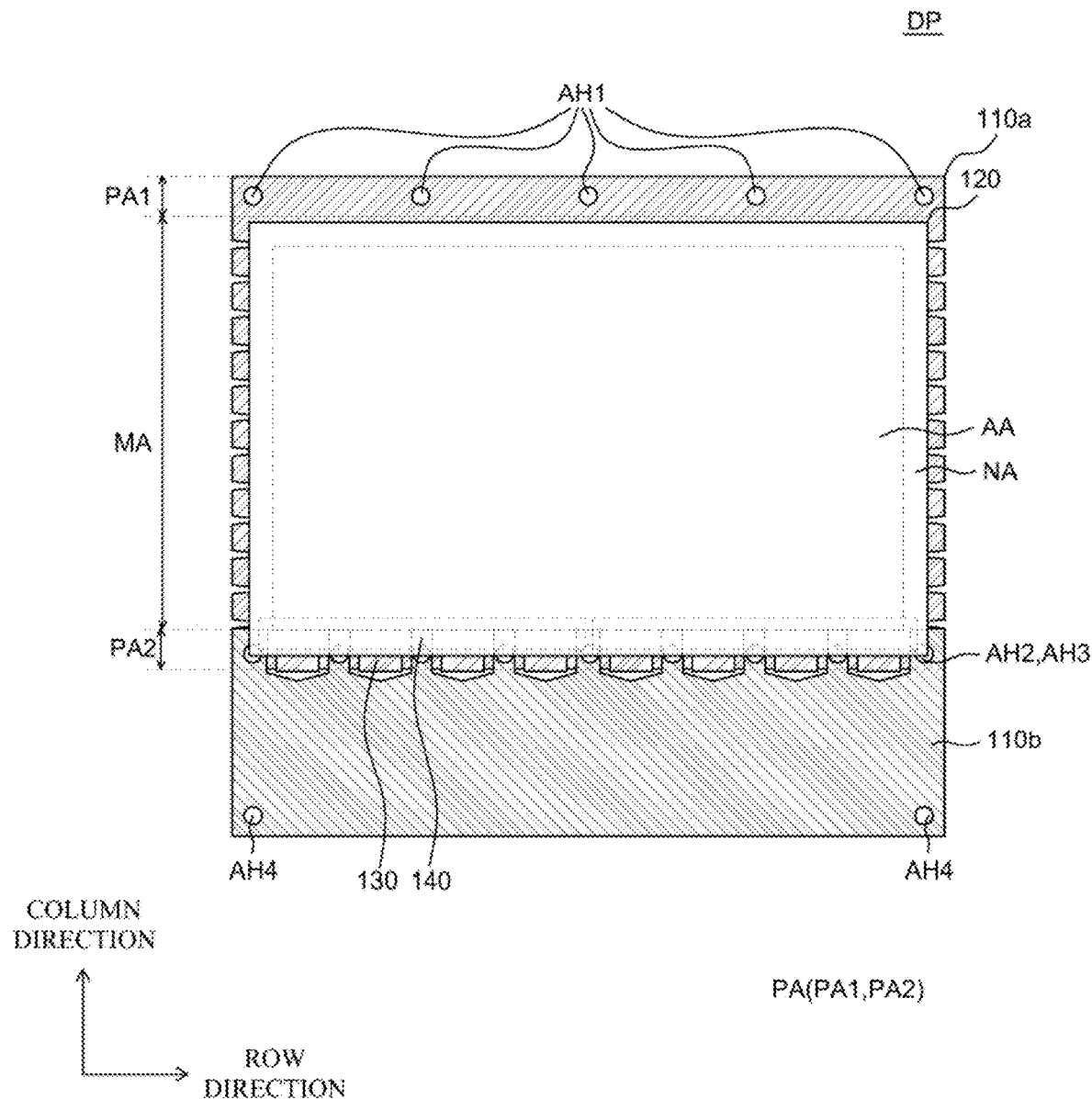
FIG. 4B is a top plan view of a display unit of the display device according to the aspect of the present disclosure.

FIG. 4A is an exploded perspective view for explaining a first cover and a second cover of the display device according to the aspect of the present disclosure. FIG. 4B is a top plan view of the display unit of the display device according to the aspect of the present disclosure.

Referring to FIGS. 4A and 4B, the display unit DP includes a first cover 110a, a display panel 120, a plurality of flexible films 130, a printed circuit board 140, and a second cover 110b. However, the present disclosure is not limited thereto. The display unit DP may include only the display panel 120, the plurality of flexible films 130, and the printed circuit board 140. For the convenience of description, a cover part 150 is omitted in FIGS. 4A and 4B.

Referring to FIGS. 4A and 4B, the first cover 110a is disposed on the rear surface of the display panel 120 and supports the display panel 120. Since the first cover 110a is disposed on the rear surface of the display panel 120, the first cover 110a may be called a back cover. A size of the first cover 110a may be larger than a size of the display panel 120. The first cover 110a may protect other components of the display unit DP from the outside.

The first cover 110a may be made of a material having rigidity. At least a part of the first cover 110a may have flexibility so as to be wound or unwound together with the display panel 120. For example, the first cover 110a may be made of a metallic material such as stainless steel (steel use stainless (SUS)) or Invar or a plastic material. However, the material of the first cover 110a may be variously changed in accordance with design as long as the material of the first cover 110a satisfies physical property conditions such as a thermal deformation amount, a radius of curvature, rigidity, and the like. However, the present disclosure is not limited thereto.

The first cover 110a includes a plurality of support areas PA and a malleable area MA. The plurality of support areas PA are areas in which a plurality of opening portions 111 are not disposed. The malleable area MA is an area in which the plurality of opening portions 111 are disposed. Specifically, the first cover 110a includes a first support area PA1, the malleable area MA, and the second support area PA2. The first support area PA1, the malleable area MA, and the second support area PA2 are sequentially disposed from the uppermost end of the first cover 110a.

In this case, when the first cover 110a is wound or unwound in a column direction, the plurality of support areas PA and the malleable area MA of the first cover 110a may be disposed in the column direction, as illustrated in FIG. 4A. In a case in which the first cover 110a is wound in a row direction, the plurality of support areas PA and the malleable area MA may so be disposed in the row direction. However, the present disclosure is not limited thereto.

The first support area PA1 of the first cover 110a is an uppermost end region of the first cover 110a fastened to the head bar 172. First fastening holes AH1 may be formed in the first support area PA1 so that the first support area PA1 is fastened to the head bar 172. For example, screws are disposed to penetrate the first fastening holes AH1 and the head bar 172, such that the head bar 172 and the first support area PA1 may be fastened to each other. Further, since the first support area PA1 is fastened to the head bar 172, the first cover 110a may also move upward or downward when the link unit 171 fastened to the head bar 172 moves upward or downward. Further, the display panel 120 attached to the first cover 110a may also move upward or downward. FIGS. 4A and 4B illustrate five first fastening holes AH1. However, the number of first fastening holes AH1 is not limited thereto. In addition, the configuration has been described in which the first cover 110a is fastened to the head bar 172 by using the first fastening hole AH1. However, the present disclosure is not limited thereto, and the first cover 110a and the head bar 172 may be fastened to each other without a fastening hole.

The malleable area MA of the first cover 110a is an area extending downward from the first support area PA1 to the lower side of the first cover 110a. The malleable area MA is an area in which the plurality of opening portions 111 are disposed and to which the display panel 120 is attached. Specifically, the malleable area MA is an area in which the roller 161 is wound or unwound together with the display panel 120. The malleable area MA may overlap at least the display panel 120 among the other components of the display unit DP.

The second support area PA2 of the first cover 110a is a lowermost area of the first cover 110a that extends from the malleable area MA. One end of the display panel 120 is disposed in the second support area PA2. For example, a pad area in a non-display area NA disposed at one end of the display panel 120 may be disposed in the second support area PA2.

Referring to FIG. 4A, second fastening holes AH2 are disposed in the second support area PA2. The second fastening holes AH2 may be holes for fixing the cover part 150, the second cover 110b, and the first cover 110a which will be described below. FIG. 4A illustrates nine second fastening holes AH2. However, the number of second fastening holes AH2 is an example, and the present disclosure is not limited thereto.

Meanwhile, the plurality of opening portions 111, which are formed in the malleable area MA, are not formed in the first support area PA1 and the second support area PA2. Specifically, the first fastening holes AH1 are formed in the first support area PA1, and the second fastening holes AH2 are formed in the second support area PA2. However, the plurality of opening portions 111 formed in the malleable area MA are not formed in the first support area PA1 and the second support area PA2. In addition, the first and second fastening holes AH1 and AH2 are different in shape from the plurality of opening portions 111.

The first support area PA1 is an area fixed to the head bar 172. The second support area PA2 is an area that supports one end of the display panel 120, the plurality of flexible films 130, and the printed circuit board 140 in a flat manner. The first and second support areas may have higher rigidity than the malleable area MA. Further, since the first and second support areas PA1 and PA2 have rigidity, the first and second support areas PA1 and PA2 may be securely fixed to the head bar 172 and the second cover 110b. The second support area PA2 may maintain the printed circuit board 140 and the pad area at one end of the display panel 120 in a flat shape, thereby protecting the printed circuit board 140 and the pad area of the display panel 120. Therefore, the display unit DP may be fixed to the head bar 172 of the driving unit MP and moved to the inside or outside of the housing unit HP by the operation of the driving unit MP. The second support area may protect the printed circuit board 140 and the pad area at one end of the display panel 120.

The plurality of opening portions 111 disposed in the malleable area MA of the first cover 110a may be deformed by stress applied to the display unit DP while the display unit DP is wound or unwound. Specifically, the malleable area MA of the first cover 110a may be deformed as the plurality of opening portions 111 contract or expand while the display unit DP is wound or unwound. Further, since the plurality of opening portions 111 contract or expand, a slip of the display panel 120 disposed on the malleable area MA of the first cover 110a is minimized, such that stress to be applied to the display panel 120 may be minimized.

The second cover 110b may be fastened to the first cover 110a and the roller 161 and connect the first cover 110a and the roller 161. As described above, the second cover 110b may connect the first cover 110a and the roller 161 and finally connect the roller 161 and the display panel 120 disposed on the first cover 110a. However, the present disclosure is not limited thereto. The shape of the second cover 110b or the connection method may be variously changed in accordance with design as long as the second cover 110b may be connected to the first cover 110a and the roller 161. However, the present disclosure is not limited thereto.

One end of the second cover 110b is an uppermost end region of the second cover 110b and may overlap one end of the first cover 110a. For example, one end of the second cover 110b may overlap the second support area PA2. One end of the second cover 110b may be connected to and overlap a part of the first cover 110a or connected to a part of the first cover 110a by using a connection member or the like. However, the present disclosure is not limited thereto.

The second cover 110b may include a plurality of fastening parts FP that overlap the first cover 110a. The plurality of fastening parts FP are disposed at one end of the second cover 110b. In addition, a plurality of third fastening holes AH3 may be respectively disposed in the plurality of fastening parts FP so as to be fastened to the first cover 110a. The plurality of fastening parts FP having the plurality of third fastening holes AH3 are spaced apart from one another, such that a space in which the plurality of flexible films 130 may be bent may be ensured between the plurality of fastening parts FP. The third fastening holes AH3 may be holes for fixing the second cover 110b and the cover part 150 to be described below. FIG. 4A illustrates nine third fastening holes AH3. However, the number of third fastening holes AH3 is an example, and the present disclosure is not limited thereto.

FIG. 4A illustrates that the second fastening holes AH2 and the third fastening holes AH3 for fastening the cover part 150, the first cover 110a, and the second cover 110b are respectively disposed in the second support area PA2 of the first cover 110a and one end of the second cover 110b. However, the first cover 110a, the second cover 110b, and the cover part 150 may be fixed to one another without a separate fastening hole.

Meanwhile, when the second support area PA2 and the plurality of fastening parts FP are wound around the roller 161, the outer peripheral surface of the roller 161 on which the second support area PA2 and the plurality of fastening parts FP overlap one another may be a flat portion. Therefore, the second support area PA2 may always be kept flat regardless of a state in which the second support area PA2 is wound around or unwound from the roller 161. The printed circuit board 140 and the pad area at one end of the display panel 120 disposed on the second support area PA2 may also be kept flat.

A region from one end to the other end of the second cover 110b is a region extending so that a display area AA of the display panel 120 may be disposed outside the housing unit HP. For example, when the first cover 110a and the display panel 120 are in the fully unwound state, the region from the other end of the second cover 110b fixed to the roller 161 to one end of the second cover 110b at which the plurality of flexible films 130 and the printed circuit board 140 are disposed may be disposed inside the housing unit HP. The malleable area MA on which the display area AA of the display panel 120 is disposed and the first support area PA1 may be disposed outside the housing unit HP. That is, the region from the other end of the second cover 110b fixed to the roller 161 to the second support area PA2 and at least a part of one end of the second cover 110b may be disposed inside the housing unit HP.

The other end of the second cover 110b is a lowermost end region of the second cover 110b that is fastened to the roller 161. Fourth fastening holes AH4 may be formed at the other end of the second cover 110b so that the second cover 110b is fastened to the roller 161. For example, fastening members are disposed to penetrate the roller 161 and the fourth fastening holes AH4, such that the roller 161 may be fastened to the other end of the second cover 110b. Further, as the other end of the second cover 110b is fastened to the roller 161, the display panel 120, the first cover 110a, and the second cover 110b may be wound around or unwound from the roller 161. FIG. 4A illustrates two fourth fastening holes AH4. However, the number of fourth fastening holes AH4 is not limited thereto.

Meanwhile, the plurality of opening portions 111, which are formed in the malleable area MA of the first cover 110a, may not be formed in the second cover 110b. Specifically, the third fastening holes AH3 and the fourth fastening holes AH4 are formed at one end and the other end of the second cover 110b. However, the plurality of opening portions 111, which are formed in the malleable area MA of the first cover 110a, are not formed in the second cover 110b. In addition, the third fastening hole AH3 and the fourth fastening hole AH4 are different in shape from the plurality of opening portions 111.

The second cover 110b may be made of a material having flexibility so that the second cover 110b may be wound around or unwound from the roller 161. For example, the second cover 110b may be made of a plastic material such as polyethylene terephthalate (PET). However, the material of the second cover 110b may be variously changed in accordance with design as long as the material of the second cover 110b satisfies physical property conditions such as a thermal deformation amount, a radius of curvature, rigidity, and the like. However, the present disclosure is not limited thereto.

Meanwhile, in the present specification, the configuration has been described in which the first cover 110a and the second cover 110b are separately formed. However, the present disclosure is not limited thereto. The first cover 110a and the second cover 110b may be integrated, but the present disclosure is not limited thereto.

Referring to FIG. 4B, the display panel 120 is disposed on one surface of the first cover 110a. The display panel 120 is disposed in the malleable area MA on one surface of the first cover 110a. The display panel 120 is a panel configured to display images to a user. The display panel 120 may include a display element configured to display images, a driving element configured to operate the display element, and lines configured to transmit various types of signals to the display element and the driving element.

The display elements may have different configurations depending on the type of display panel 120. For example, in a case in which the display panel 120 is an organic light-emitting display panel, the display element may be an organic light-emitting element including an anode, an organic light-emitting layer, and a cathode. For example, in a case in which the display panel 120 is a liquid crystal display panel, the display element may be a liquid crystal display element. In addition, since the display device 100 according to the aspect of the present disclosure is a rollable display device, the display panel 120 may be implemented as a flexible display panel so as to be wound around or unwound from the roller 161.

The display panel 120 include a display area AA and a non-display area NA.

The display area AA is an area of the display panel 120 in which images are displayed. The display area AA may include a plurality of sub pixels constituting the plurality of pixels, and a circuit configured to operate the plurality of sub pixels. The plurality of sub pixels is minimum units constituting the display area AA. The display element may be disposed in each of the plurality of sub pixels. For example, the plurality of sub pixels may each include the light-emitting element including the anode, a light-emitting part, and a cathode. However, the present disclosure is not limited thereto. In addition, the drive circuit configured to operate the plurality of sub pixels may include driving elements, lines, and the like. For example, the drive circuit may include, but not limited to, a thin-film transistor, a storage capacitor, a gate line, a data line, and the like.

The non-display area NA is an area in which no image is displayed. Various lines and circuits for operating the organic light-emitting element in the display area AA are disposed in the non-display area NA. For example, the non-display area NA may include, but not limited to, link lines for transmitting signals to the plurality of sub pixels and the drive circuit in the display area AA. The non-display area NA may include a drive IC such as a gate driver IC and a data driver IC.

Meanwhile, the non-display area NA may include a pad area. The pad area is an area in which a plurality of pad electrodes is disposed. The plurality of pad electrodes are electrodes for electrically connecting the plurality of flexible films 130 and the display panel 120. The plurality of flexible films 130 and the display panel 120 may be electrically connected through the plurality of pad electrodes. In this case, in the non-display area NA, the pad area may be an area in which the plurality of flexible films 130 are bonded. The pad area may be the non-display area NA that overlaps the second support area PA2 of the first cover 110*a*. However, the pad area may be formed in another portion of the non-display area NA in accordance with the arrangement of the plurality of flexible films 130. However, the present disclosure is not limited thereto.

Referring to FIG. 4B, the plurality of flexible films 130 are disposed at one end of the display panel 120. The plurality of flexible films 130 each are a film having various types of components disposed on a base film having ductility in order to supply signals to the plurality of sub pixels and the drive circuit in the display area AA. The plurality of flexible films 130 may be electrically connected to the display panel 120. The plurality of flexible films 130 are disposed at one end of the non-display area NA of the display panel 120 and may supply power voltage, data voltage, and the like to the plurality of sub pixels and the drive circuit in the display area AA. Meanwhile, FIG. 4B illustrates eight flexible films 130. However, the number of flexible films 130 may be variously changed in accordance with design. However, the present disclosure is not limited thereto.

The drive ICs such as gate driver ICs and data driver ICs may be disposed on base films of the plurality of flexible films 130. The drive IC is a component configured to process data for displaying the image and process a driving signal for processing the data. The drive IC may be disposed in ways such as a chip-on-glass (COG) method, a chip-on-film (COF) method, and a tape carrier package (TCP) method depending on how the drive IC is mounted. However, in FIG. 4B, for the convenience of description, the configuration has been described in which the drive ICs are mounted on the plurality of flexible films 130 by the chip-on-film method. However, the present disclosure is not limited thereto.

Meanwhile, one end of each of the plurality of flexible films 130 may be bonded onto the display panel 120, and the other end of each of the plurality of flexible films 130 may be bent toward the rear surface of the first cover 110*a*. The plurality of flexible films 130 may be bent through the space between the fastening parts FP, such that the other end of each of the plurality of flexible films 130 may be disposed on the rear surface of the first cover 110*a*. One end of each of the plurality of flexible films 130 may be disposed on one surface of the first cover 110*a*, and the other end of each of the plurality of flexible films 130 may be disposed on a surface of the first cover 110*a* opposite to the one surface of the first cover 110*a*. This configuration will be described below in detail with reference to FIG. 6.

Referring to FIG. 4B, the printed circuit board 140 is disposed on the rear surface of the first cover 110*a* and connected to the plurality of flexible films 130. That is, the printed circuit board 140 disposed adjacent to the rear surface of the first cover 110*a* and electrically connected to the plurality of flexible films 130. The printed circuit board 140 is a component configured to supply a signal to the drive IC of each of the plurality of flexible films 130. Various types of components for supplying the drive IC with various signals such as driving signals, data signals, and the like may be disposed on the printed circuit board 140. Meanwhile, FIG. 4B illustrates two printed circuit boards 140. However, the number of printed circuit boards 140 may be variously changed in accordance with design. The present disclosure is not limited thereto.

Although not illustrated in FIG. 4B, an additional printed circuit board connected to the printed circuit board 140 may be further disposed. For example, the printed circuit board 140 may be called a source printed circuit board (source PCB (S-PCB)) on which a data driver is mounted. The additional printed circuit board connected to the printed circuit board 140 may be called a control printed circuit board (control PCB (C-PCB)) on which the timing controller and the like are mounted. The additional printed circuit board may be disposed in the roller 161, disposed on the housing unit HP outside the roller 161, or disposed to directly adjoin the printed circuit board 140.

Meanwhile, among the components of the display unit DP, the pad area, the plurality of flexible films 130, and the printed circuit board 140 of the display panel 120 are vulnerable to external impact and may be easily damaged by the impact. Therefore, the cover part 150 may be further disposed to protect the pad area of the display panel 120, the plurality of flexible films 130, and the printed circuit board 140. The cover part 150 may be disposed to surround the pad area of the display panel 120, the plurality of flexible films 130, and the printed circuit board 140. The cover part 150 may minimize impact to be applied to the pad area of the display panel 120, the plurality of flexible films 130, and the printed circuit board 140 during the process of repeatedly winding the display unit DP around the roller 161 or unwinding the display unit DP from the roller 161.

In addition, the roller 161 may also include a flat portion 161F and a plurality of curved portions 161R1 and 161R2, thereby minimizing the transmission of stress to the pad area when the pad area of the display panel 120, the plurality of flexible films 130, and the printed circuit board 140 are bent and damaged or a part of the display panel 120 is excessively bent during the process of winding and unwinding the display unit DP.

Hereinafter, the cover part 150 and the roller 161 of the display device 100 according to the aspect of the present disclosure will be described in more detail with reference to FIGS. 5 to 7.

Figure 5:
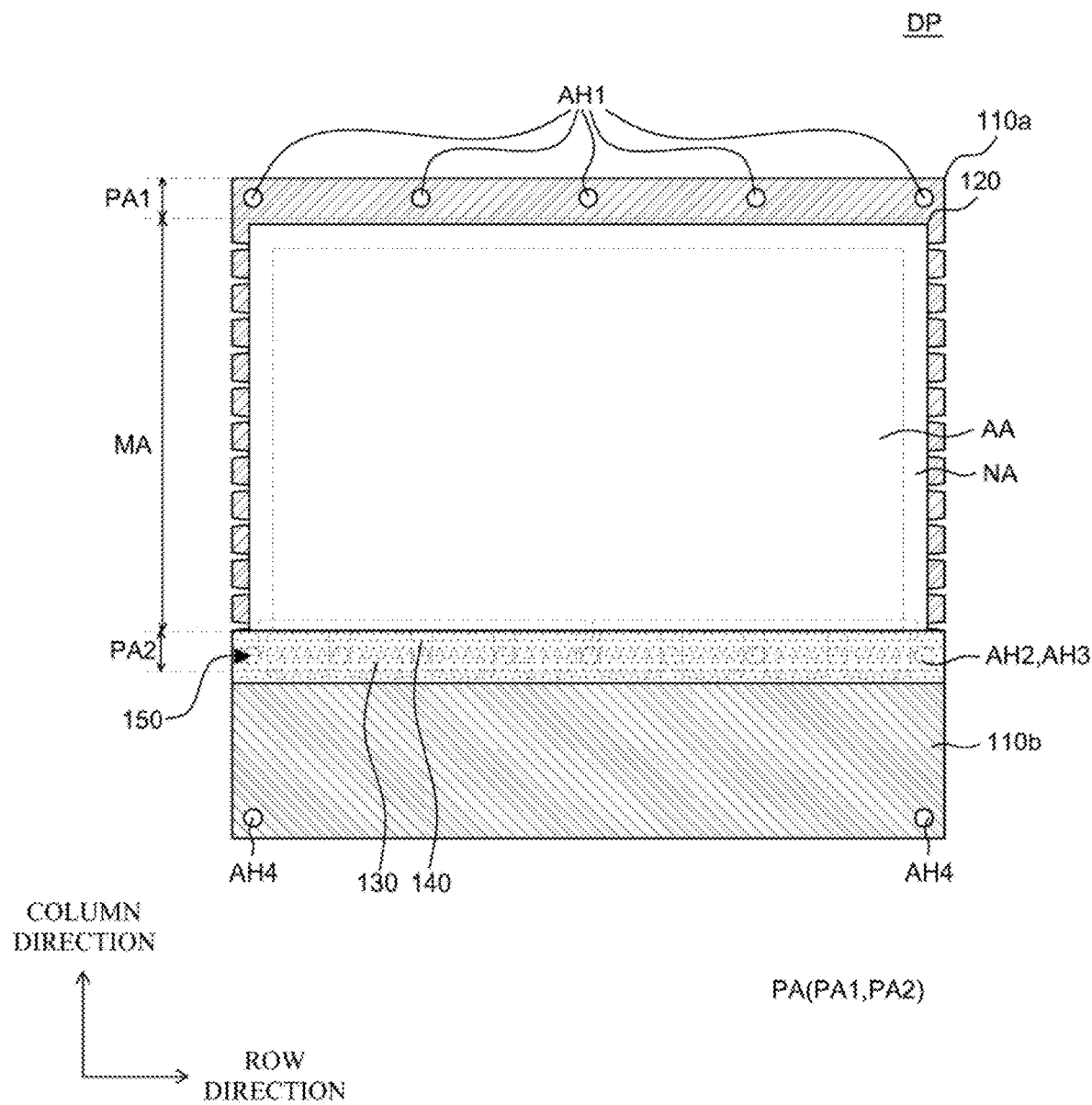
FIG. 5 is a top plan view of the display device according to the aspect of the present disclosure.

FIG. 5 is a top plan view of the display device according to the aspect of the present disclosure. FIG. 6 is a cross-sectional view of the display device according to the aspect of the present disclosure. FIG. 7 is an enlarged cross-sectional view of the display device according to the aspect of the present disclosure.

Figure 6:
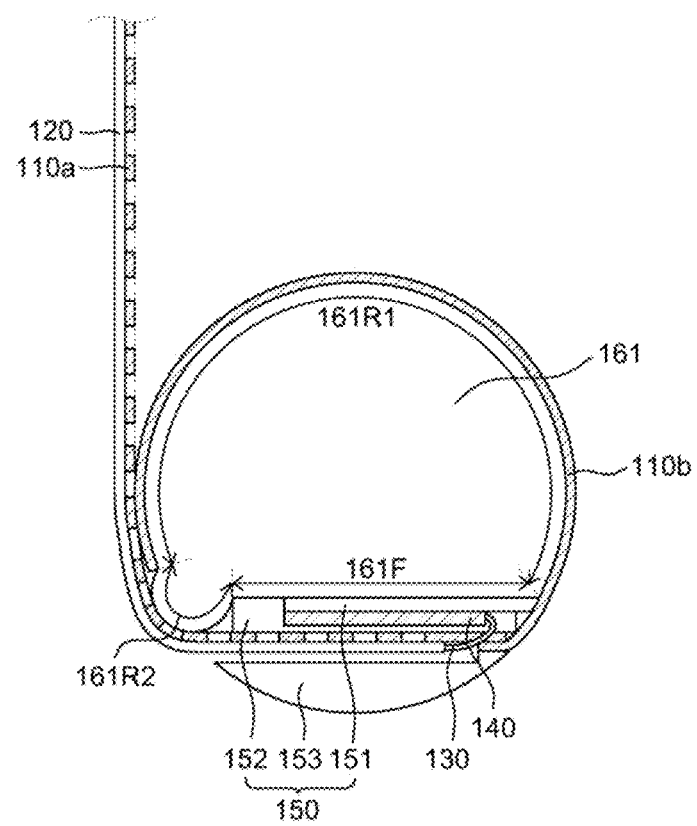
FIG. 6 is a cross-sectional view of the display device according to the aspect of the present disclosure.
Figure 7:
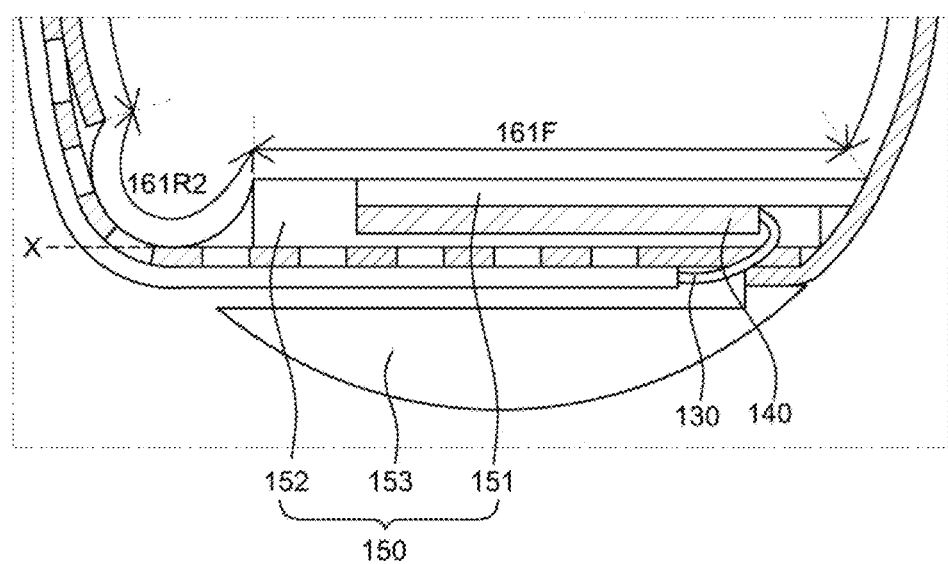
FIG. 7 is an enlarged cross-sectional view of the display device according to the aspect of the present disclosure.

Referring to FIGS. 5 and 6, the cover part 150 is disposed to accommodate and protect the pad area of the display panel 120, the plurality of flexible films 130, and the printed circuit board 140. The cover part 150 may be disposed in second support area PA2 of the first cover 110a and at one end of the second cover 110b and connect the first cover 110a and the second cover 110b. In addition, the cover part 150 may maintain the printed circuit board 140 and the pad area at one end of the display panel 120 in the flat state and protect the plurality of flexible films 130.

The cover part 150 includes a top cover 153, a bottom cover 152, and a base plate 151.

The top cover 153 is disposed on one surface of the display panel 120. The top cover 153 is disposed to cover the pad area in the non-display area NA of the display panel 120 and the plurality of flexible films 130. The top cover 153 may be disposed to cover only the pad area, which is the non-display area NA at one end of the display panel 120, without covering the display area AA of the display panel 120. If the top cover 153 covers the display area AA, the image displayed in the display area AA may be blocked. Therefore, the top cover 153 may be disposed to overlap only the non-display area NA.

The top cover 153 may be made of a material having rigidity, such that the top cover 153 may not be deformed when the display unit DP is wound. The top cover 153 may protect the pad area at one end of the display panel 120 and the plurality of flexible films 130.

An outer surface of the top cover 153 may have a convex shape and be connected to the curved portion of the roller 161, thereby defining a rounded shape or defining a circular shape connected to the curved portion of the roller 161. That is, one surface of the top cover 153 may be formed as a curved surface. Further, when the display unit DP is wound, the top cover 153 may define a rounded shape connected to the curved portion of the roller 161 or define a circular shape connected to the curved portion of the roller 161.

The bottom cover 152 is disposed on a surface of the first cover 110a opposite to one surface of the first cover 110a, i.e., the rear surface of the first cover 110a. The bottom cover 152 is disposed between the first cover 110a and the printed circuit board 140. The bottom cover 152 may be fixed to one end of the second cover 110b and disposed to correspond to a part of the malleable area MA and the entire second support area PA2 of the first cover 110a. The pad area at one end of the display panel 120, the plurality of flexible films 130, and the printed circuit board 140 may be seated on the bottom cover 152.

The base plate 151 is disposed on the rear surface of the bottom cover 152. The base plate 151 may have a plate shape and cover an exposed surface of the printed circuit board 140 and the rear surface of the bottom cover 152.

In this case, the first cover 110a and the second cover 110b may be fastened to each other by fixing members that penetrate the top cover 153, the second cover 110b, the first cover 110a, the bottom cover 152, and the base plate 151. In this case, the fixing member may be a screw member such as a screw or bolt, for example. However, the present disclosure is not limited thereto.

The base plate 151 may be disposed to correspond to a position at which the printed circuit board 140 is seated on the bottom cover 152. The bottom cover 152 may have a groove corresponding in shape to the base plate 151, and the base plate 151 is seated in the groove of the bottom cover 152. A surface formed by connecting one surface of the bottom cover 152 and one surface of the base plate 151 may be formed as a flat surface having no protruding portion.

Therefore, since the base plate 151 covers the exposed surface of the printed circuit board 140, the printed circuit board 140 may be accommodated without being exposed to the outside. In addition, since the rear surface of the bottom cover 152 has no protruding portion, the cover part 150 may be completely seated on the flat portion 161F of the roller 161 when the cover part 150 is wound around the roller 161.

The plurality of flexible films 130 may be bent from one end of the display panel 120 and disposed to surround the end of the first cover 110a. The flexible film 130 electrically connected to the pad area at one end of the display panel 120 may be bent from the end of the first cover 110a toward the rear surface of the bottom cover 152 and electrically connected to the printed circuit board 140 seated on the rear surface of the bottom cover 152. In this case, the second cover 110b may include the plurality of fastening parts FP that overlap the first cover 110a. The plurality of flexible films 130 may be bent from the end of the first cover 110a through the space between the plurality of fastening parts FP.

The roller 161 connected to the second cover 110b is disposed. The display panel 120 connected to the roller 161 through the second cover 110b may be wound around the roller 161 or unwound from the roller 161 by the rotation of the roller 161. The end of the second cover 110b may be connected to the outer peripheral surface of the roller 161. For example, the second cover 110b may be connected to the roller 161 as the fastening members are disposed to penetrate the roller 161 and the fourth fastening holes AH4 formed at the other end of the second cover 110b. FIG. 6 illustrates that the other end of the second cover 110b is connected to the first curved portion 161R1 of the roller 161. However, the other end of the second cover 110b may be connected to the flat portion 161F or the second curved portion 161R2 of the roller 161. However, the present disclosure is not limited thereto.

The roller 161 includes the flat portion 161F, the first curved portion 161R1, and the second curved portion 161R2. The outer peripheral surface of the roller 161 includes the flat portion 161F, the first curved portion 161R1 extending from the flat portion 161F, and the second curved portion 161R2 extending from the first curved portion 161R1 toward the flat portion 161F.

The flat portion 161F of the roller 161 is a portion around which the pad area of the display panel 120, the printed circuit board 140, and the plurality of flexible films 130, among the components of the display unit DP, are wound. The pad area of the display panel 120, the printed circuit board 140, and the plurality of flexible films 130, which are wound around the flat portion 161F, may be supported to be always kept flat by the flat portion 161F and the cover part 150.

The first curved portion 161R1 is a portion extending from the flat portion 161F. The first curved portion 161R1 is a portion extending from one end of the flat portion 161F while having a first radius of curvature. Therefore, a part of the display unit DP wound around the first curved portion 161R1 may be curved while having the first radius of curvature.

The second curved portion 161R2 is a portion extending from the other end of the flat portion 161F toward the first curved portion 161R1. The second curved portion 161R2 is disposed between the first curved portion 161R1 and the flat portion 161F. A part of the display panel 120 adjacent to the pad area may be wound around the second curved portion 161R2. The second curved portion 161R2 may have a second radius of curvature smaller than the first radius of curvature of the first curved portion 161R1. A surface area of the second curved portion 161R2 may be smaller than a surface area of the first curved portion 161R1. For example, the first radius of curvature of the first curved portion 161R1 may be about 40R, and the radius of curvature of the second curved portion 161R2 may be about 6R.

One surface of the bottom cover 152 of the cover part 150, which support the display panel 120 and first cover 110*a*, may be disposed on the same plane as a tangential plane of the second curved portion 161R2. The first cover 110*a*, which supports the pad area of the display panel 120 disposed in the cover part 150, may be disposed on the same plane as the tangential plane of the second curved portion 161R2. As illustrated in FIG. 6, the first curved portion 161R1 is disposed on one surface of the flat portion 161F based on the flat portion 161F. However, one part of the second curved portion 161R2 may be disposed on one surface of the flat portion 161F, and the remaining part of the second curved portion 161R2 may be disposed under one surface of the flat portion 161F. For example, an imaginary plane X extending from one surface of the bottom cover 152 may adjoin the second curved portion 161R2. One surface of the bottom cover 152 may be disposed on the same plane as the outer peripheral surface of the second curved portion 161R2 of the roller 161. In this case, a part of the display panel 120 extending to the outside of the cover part 150 may be disposed on the same plane as the pad area inside the cover part 150 by means of the second curved portion 161R2.

In this case, the display panel 120 and the first cover 110*a*, which are wound around the second curved portion 161R2 having the second radius of curvature may be curved while having a radius of curvature larger than the second radius of curvature. A part of the display panel 120 and a part of the first cover 110*a*, which extend to the outside of the cover part 150, adjoin a part of the second curved portion 161R2. Therefore, when the display panel 120 and the first cover 110*a* are wound around the second curved portion 161R2, the display panel 120 and the first cover 110*a* may be curved while having the radius of curvature different from the second radius of curvature of the second curved portion 161R2. That is, since the display panel 120 and the first cover 110*a* are curved while adjoining only a part of the second curved portion 161R2, the radii of curvature of the display panel 120 and the first cover 110*a*, which are curved while being wound around the second curved portion 161R2, may be different from the second radius of curvature of the second curved portion 161R2. Further, since the display panel 120 and the first cover 110*a* are curved to a minimum degree while adjoining only a part of the second curved portion 161R2, the display panel 120 and the first cover 110*a* may be curved while having a radius of curvature larger than the second radius of curvature of the second curved portion 161R2. For example, when the second radius of curvature of the second curved portion 161R2 is 6R, the display unit DP may be wound while being curved with a radius of curvature of about 32R on the second curved portion 161R2.

In particular, the outer peripheral surface of the second curved portion 161R2 is disposed on the same plane as the imaginary plane X extending from one surface of the bottom cover 152 that supports the first cover 110*a* and one end of the display panel 120 disposed in the cover part 150. Therefore, the display panel 120 and the first cover 110*a*, which extend to the outside of the cover part 150, may be wound while maintaining a state close to a flat state between the cover part 150 and the second curved portion 161R2. Therefore, the second curved portion 161R2 protrudes to the outside of the flat portion 161F so as to correspond to one surface of the bottom cover 152. Therefore, the display unit DP may not be excessively curved between the flat portion 161F and the second curved portion 161R2.

If only the first curved portion 161R1 and the flat portion 161F are present without the second curved portion 161R2, a part of the display panel 120 may be curved while being bent excessively in a boundary area between the first curved portion 161R1 and the flat portion 161F. In particular, the region between the first curved portion 161R1 and the flat portion 161F is a small-curvature region having a small radius of curvature. For this reason, the display panel 120, which is wound between the first curved portion 161R1 and the flat portion 161F, may be easily damaged by being curved to have a small radius of curvature. Further, the display panel 120 and the first cover 110*a* outside the cover part 150 may be wound while being curved excessively because of a level difference between the flat portion 161F, the base plate 151, and the bottom cover 152 that supports one end of the display panel 120. In this case, a part of the display panel 120 adjacent to the pad area is repeatedly and excessively curved, which may affect the pad area or damage the pad area.

Meanwhile, the second curved portion 161R2 may not be disposed between the first curved portion 161R1 and one end of the flat portion 161F. The second cover 110*b* is wound first between the first curved portion 161R1 of one end of the flat portion 161F. Thereafter, the display panel 120 may be wound along the curved surface defined by the first curved portion 161R1 and the top cover 153 of the cover part 150. Therefore, the display panel 120 may be wound while being curved gently between the first curved portion 161R1 and one end of the flat portion 161F. Therefore, the second curved portion 161R2, which supports the display panel 120 to inhibit the display panel 120 from being curved with a small radius of curvature, may not be disposed between the first curved portion 161R1 and one end of the flat portion 161F.

The display device 100 according to the aspect of the present disclosure includes the cover part 150 disposed to support the pad area of the display panel 120 and the printed circuit board 140 in the flat state. Therefore, it is possible to minimize damage to the display panel 120 and the printed circuit board 140. Specifically, when the display unit DP is wound around the roller 161, the first cover 110a and the second cover 110b may be wound while being curved along the shape of the roller 161. Further, the display panel 120 and the printed circuit board 140 may also be wound while being curved along the shape of the roller 161. Meanwhile, there is a high likelihood that a crack may occur in the vicinity of the edge of the display panel 120 during the process of repeatedly winding and unwinding the display unit DP. For example, when the pad area of the display panel 120 is repeatedly curved, the components disposed on the pad area, for example, the plurality of pad electrodes and various types of lines, which are made of a metallic material having hardness and low ductility, may be relatively easily cracked by stress. The crack may propagate to other portions of the display panel 120 and cause a defect of the display device 100. In addition, when the printed circuit board 140 made of a hard material is curved, the printed circuit board 140 may be damaged. Therefore, the pad area of the display panel 120 and the printed circuit board 140 are disposed in the cover part 150 made of a material having rigidity. Therefore, the pad area of the display panel 120 and the printed circuit board 140 may be kept flat and protected. In addition, a part of the roller 161 around which the cover part 150 is wound has the flat portion. Therefore, the pad area, the printed circuit board 140, and the cover part 150 may be wound around the roller 161 while being kept flat. Therefore, the display device 100 according to the aspect of the present disclosure includes the cover part 150 disposed to support the pad area and the printed circuit board 140. Therefore, the pad area and the printed circuit board 140 may be kept flat and protected by external impact. Further, in the display device 100 according to the aspect of the present disclosure, the flat portion is formed on the outer peripheral surface of the roller 161, such that the pad area and the printed circuit board 140 may not be curved, and damage to the display panel 120 and the printed circuit board 140 may be minimized.

In the display device 100 according to the aspect of the present disclosure, the second curved portion 161R2 is disposed between the flat portion 161F and the first curved portion 161R1 of the roller 161. Therefore, it is possible to minimize a situation in which the display panel 120 is damaged by being excessively curved in the boundary area between the first curved portion 161R1 and the flat portion 161F. The second curved portion 161R2 supports the display panel 120 so that the display panel 120 is wound while having a more gradual radius of curvature. In particular, the outer peripheral surface of the second curved portion 161R2 is disposed on the same plane as one surface of the bottom cover 152 that supports one end of the display panel 120 and the first cover 110a. Therefore, a part of the display panel 120 disposed outside the cover part 150 may be supported by the second curved portion 161R2 so as to be wound in a state close to a straight line with one end of the display panel 120 disposed inside the cover part 150. In addition, a part of the display panel 120, which is adjacent to the pad area of the display panel 120 outside the cover part 150, may adjoin only a part of the second curved portion 161R2 and be wound to have a radius of curvature more gradual than the second radius of curvature of the second curved portion 161R2. Therefore, it is possible to minimize a situation in which the stress, which occurs at the time of winding the display panel 120, is transmitted to the pad area. Therefore, in the display device 100 according to the aspect of the present disclosure, the second curved portion 161R2 may be disposed between the first curved portion 161R1 and the flat portion 161F. Therefore, it is possible to inhibit a part of the display unit DP disposed outside the cover part 150 from being excessively bent in the boundary area between the first curved portion 161R1 and the flat portion 161F and minimize damage to the pad area caused by stress transmitted to the pad area.

Figure 8:
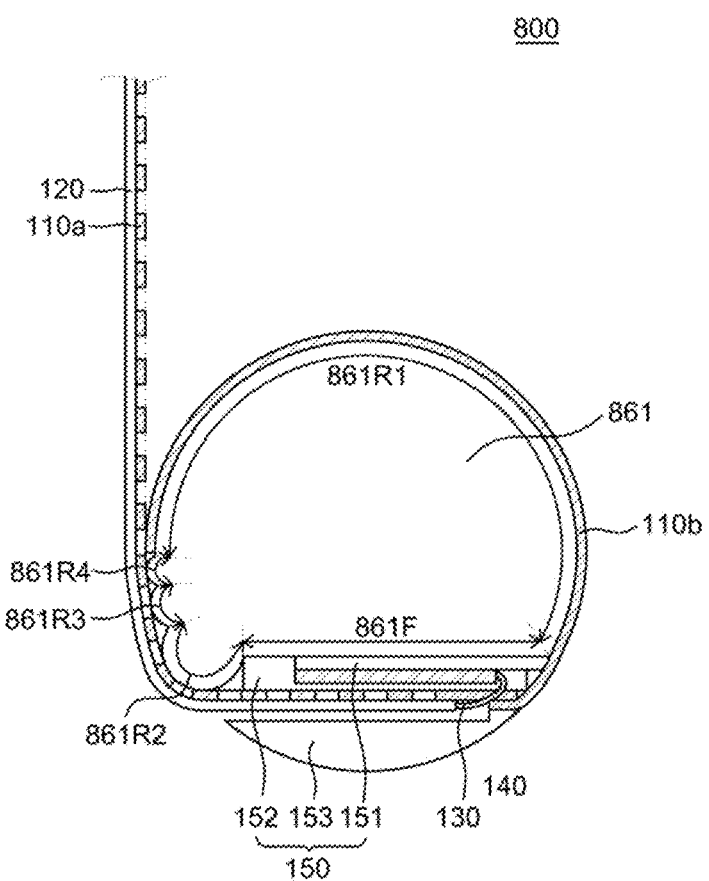
FIG. 8 is a cross-sectional view of a display device according to another aspect of the present disclosure.
Figure 9:
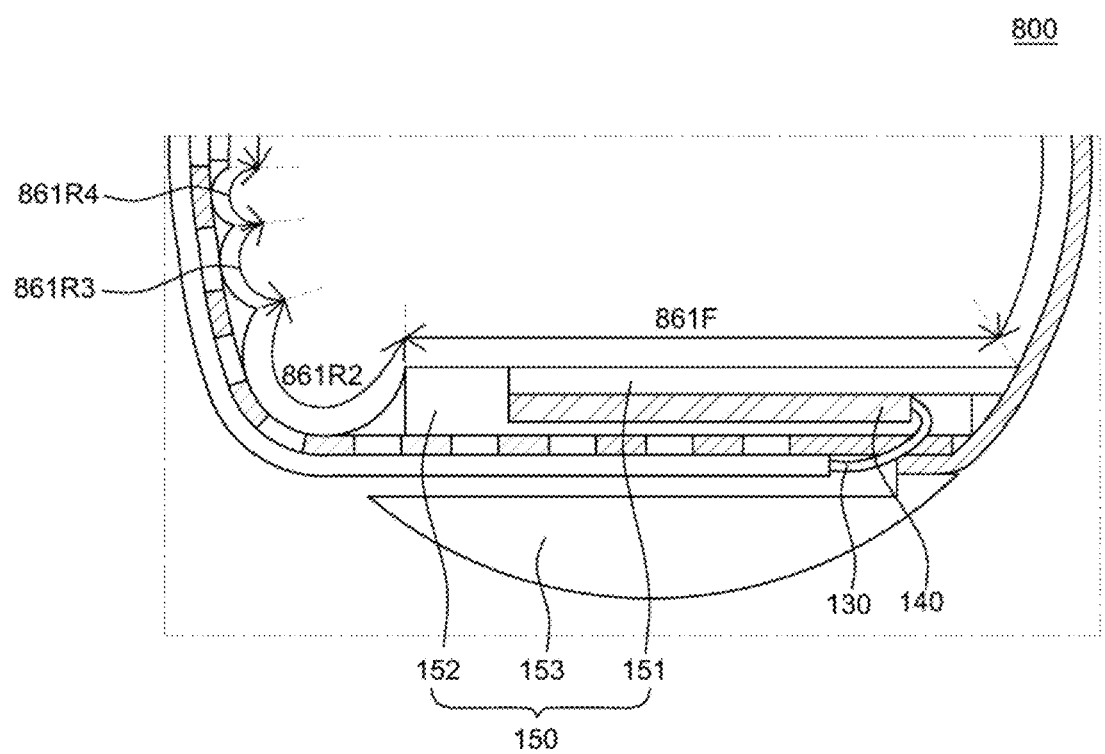
FIG. 9 is an enlarged cross-sectional view of the display device according to another aspect of the present disclosure.

FIG. 8 is a cross-sectional view of a display device according to another aspect of the present disclosure. FIG. 9 is an enlarged cross-sectional view of the display device according to another aspect of the present disclosure. A display device 800 illustrated in FIGS. 8 and 9 is substantially identical in configuration to the display device 100 illustrated in FIGS. 1 to 7, except that a roller 861 further includes a third curved portion 861R3 and a fourth curved portion 861R4. Therefore, repeated descriptions of the identical components will be omitted.

Referring to FIGS. 8 and 9, the roller 861 includes a flat portion 861F, a first curved portion 861R1, a second curved portion 861R2, the third curved portion 861R3, and the fourth curved portion 861R4. The first curved portion 861R1 is a portion extending from one end of the flat portion 861F while having a first radius of curvature. The second curved portion 861R2 is a portion extending from the other end of the flat portion 861F while having a second radius of curvature. The third curved portion 861R3 is a portion extending from the second curved portion 861R2 toward the first curved portion 861R1 while having a third radius of curvature. The fourth curved portion 861R4 is a portion extending from the third curved portion 861R3 toward the first curved portion 861R1 while having a fourth radius of curvature. The fourth curved portion 861R4 may be disposed between the third curved portion 861R3 and the first curved portion 861R1.

Among the plurality of curved portions 861R1, 861R2, 861R3, and 861R4, the first radius of curvature of the first curved portion 861R1 may be largest. Further, among the second curved portion 861R2, the third curved portion 861R3, and the fourth curved portion 861R4, the second radius of curvature of the second curved portion 861R2 closest to the flat portion 861F may be largest, and the fourth radius of curvature of the fourth curved portion 861R4 farthest from the flat portion 861F may be smallest. The third radius of curvature of the third curved portion 861R3 has a value between the second radius of curvature and the fourth radius of curvature. For example, the first radius of curvature of the first curved portion 861R1 may be 40R, the second radius of curvature of the second curved portion 861R2 may be 6R, the third radius of curvature of the third curved portion 861R3 may be 5R, and the fourth radius of curvature of the fourth curved portion 861R4 may be 4R.

A radius of curvature of the display panel 120, which is wound around the second curved portion 861R2, the third curved portion 861R3, and the fourth curved portion 861R4 of the roller 861, may have a larger value than the second radius of curvature, the third radius of curvature, and the fourth radius of curvature. The display unit DP may be wound while adjoining only a part of the second curved portion 861R2, a part of the third curved portion 861R3, and a part of the fourth curved portion 861R4. A trajectory, which is defined by a part of the second curved portion 861R2, a part of the third curved portion 861R3, and a part of the fourth curved portion 861R4, which adjoin the display unit DP, may be larger than the second radius of curvature, the third radius of curvature, and the fourth radius of curvature. For example, the display unit DP may be wound around the second curved portion 861R2, the third curved portion 861R3, and the fourth curved portion 861R4 while being curved with a radius of curvature of about 32R.

Meanwhile, a radius of curvature is a value that means a radius of an arc. As the radius of curvature increases, a size of a circle may increase, and a surface area of the curved portion may also increase. For example, the surface area of the first curved portion 861R1 having the first radius of curvature with the largest value may be largest. The surface area of the fourth curved portion 861R4 having the fourth radius of curvature with the smallest value may be smallest. Further, the surface area of the second curved portion 861R2 having the second radius of curvature smaller than the first radius of curvature of the first curved portion 861R1 may be smaller than the surface area of the first curved portion 861R1. The surface area of the third curved portion 861R3 having the third radius of curvature smaller than the second radius of curvature of the second curved portion 861R2 may be smaller than the surface area of the second curved portion 861R2.

Further, the second curved portion 861R2, the third curved portion 861R3, and the fourth curved portion 861R4 may be sequentially disposed between the flat portion 861F and the first curved portion 861R1. Therefore, it is possible to gradually reduce a difference between the radii of curvature of the display panel 120 wound around the first curved portion 861R1, the second curved portion 861R2, the third curved portion 861R3, and the fourth curved portion 861R4. If the second curved portion 861R2, the third curved portion 861R3, and the fourth curved portion 861R4 have the same radius of curvature and the same surface area, the radius of curvature of the display panel 120 may be rapidly changed in the boundary area between the fourth curved portion 861R4 and the first curved portion 861R1. In contrast, in a case in which the radii of curvature and the surface areas of the second curved portion 861R2, the third curved portion 861R3, and the fourth curved portion 861R4 are sequentially decreased, the radius of curvature of the display panel 120 wound around the second curved portion 861R2, the third curved portion 861R3, and the fourth curved portion 861R4 may be gradually changed, which may allow the radius of curvature of the display panel 120 not to be rapidly changed between the fourth curved portion 861R4 and the first curved portion 861R1. Therefore, the radii of curvature of the second curved portion 861R2, the third curved portion 861R3, and the fourth curved portion 861R4 are decreased as the distance from the flat portion 861F increases. Therefore, it is possible to reduce a difference between the radius of curvature of the display panel 120 wound around the second curved portion 861R2, the third curved portion 861R3, and the fourth curved portion 861R4 and the radius of curvature of the display panel 120 wound around the first curved portion 861R1, thereby minimizing damage to the display panel 120.

Meanwhile, FIGS. 8 and 9 illustrate that the roller 861 includes the four curved portion. However, the roller 861 may include only the first curved portion 861R1, the second curved portion 861R2, and the third curved portion 861R3 or include additional curved portions. The number of curved portions is not limited thereto.

Therefore, in the display device 800 according to another aspect of the present disclosure, the plurality of curved portions 861R2, 861R3, and 861R4 are formed in the boundary area between the first curved portion 861R1 and the flat portion 861F of the roller 861, such that the display unit DP may be supported to be wound while being gently curved. In particular, a part of the display panel 120 wound between the flat portion 861F and the second curved portion 861R2 is adjacent to the pad area. For this reason, stress, which occurs when a part of the display panel 120 is curved, may be transmitted to the pad area and cause damage to the pad area. However, the second curved portion 861R2, the third curved portion 861R3, and the fourth curved portion 861R4 may support the display panel 120 adjacent to the pad area so that the display panel 120 is wound with a larger radius of curvature. Therefore, it is possible to reduce damage to the pad area caused by the process of repeatedly winding and unwinding the display panel 120. In addition, the second curved portion 861R2, the third curved portion 861R3, and the fourth curved portion 861R4 may gradually change the radius of curvature of a part of the display panel 120 wound between the first curved portion 861R1 and the flat portion 861F. Therefore, in the display device 800 according to the aspect of the present disclosure, the second curved portion 861R2, the third curved portion 861R3, and the fourth curved portion 861R4 are disposed between the first curved portion 861R1 and the flat portion 861F. Therefore, it is possible to gradually change the radius of curvature of the display panel 120 wound around the second curved portion 861R2, the third curved portion 861R3, and the fourth curved portion 861R4 and minimize damage to the display device 800.

Figure 10A:
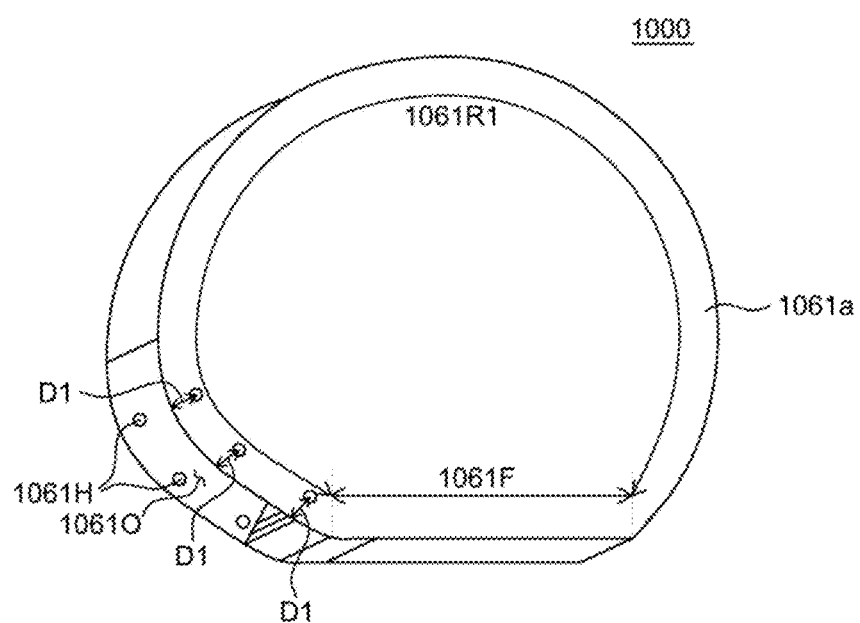
FIGS. 10A and 10B is a perspective view of a roller of the display device according to still another aspect of the present disclosure.
Figure 10B:
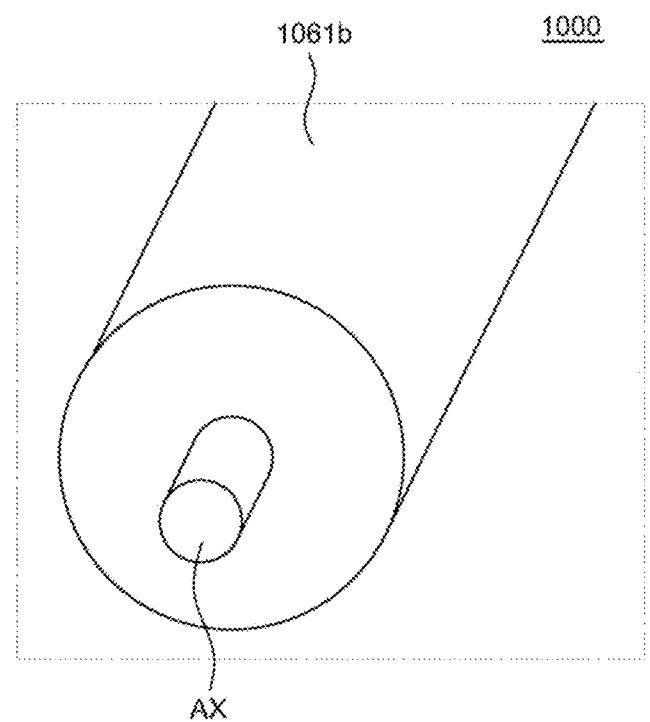
Figure 11:
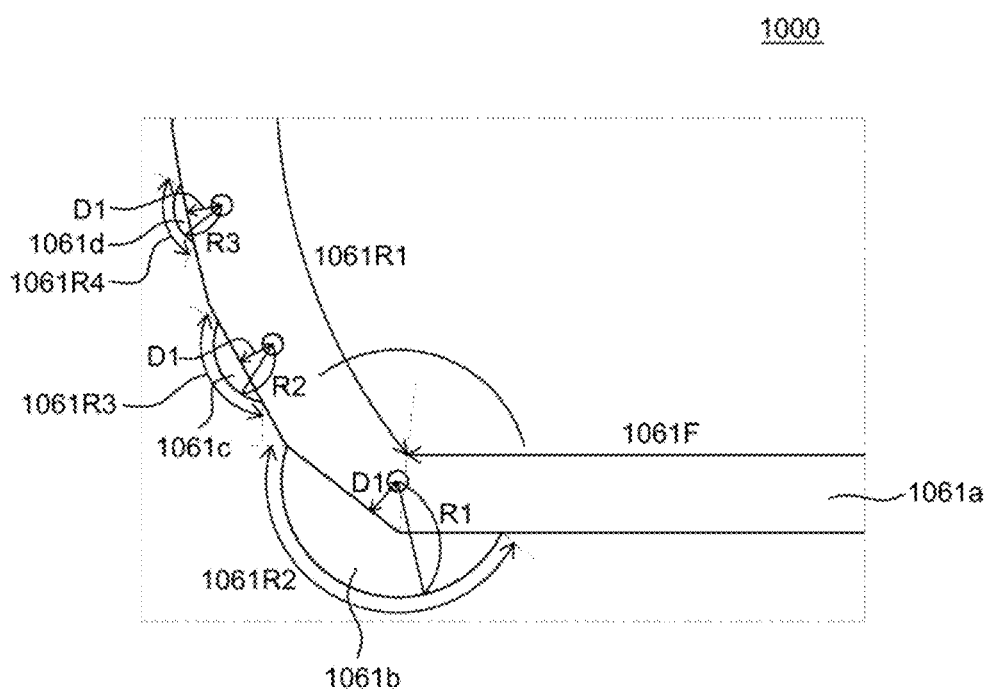
FIG. 11 is an enlarged cross-sectional view of the roller of the display device according to still another aspect of the present disclosure.

FIGS. 10A and 10B is a perspective view of a roller of the display device according to still another aspect of the present disclosure. FIG. 11 is an enlarged cross-sectional view of the roller of the display device according to still another aspect of the present disclosure. FIG. 10A is a perspective view of a main roller 1061a of a roller 1061 of a display device 1000 according to the aspect of the present disclosure. FIG. 10B is a perspective view of a first auxiliary roller 1061b of the roller 1061 of the display device 1000 according to the aspect of the present disclosure. The display device 1000 illustrated in FIGS. 10A to 11 is substantially identical in configuration to the display device 800 illustrated in FIGS. 8 and 9, except for a roller 1061. Therefore, repeated descriptions of the identical components will be omitted.

Referring to FIGS. 10A and 11, the roller 1061 includes the main roller 1061a, the first auxiliary roller 1061b, a second auxiliary roller 1061c, and a third auxiliary roller 1061d.

The main roller 1061a is a roller having a flat portion 1061F and a first curved portion 1061R1. The second cover 110b may be connected to the main roller 1061a, such that the display unit DP may be wound around the main roller 1061a or unwound from the main roller 1061a.

The main roller 1061a includes an opening region 1061O and a plurality of coupling holes 1061H. The opening region 1061O is a region formed by opening a part of the first curved portion 1061R1. The first auxiliary roller 1061b, the second auxiliary roller 1061c, and the third auxiliary roller 1061d may be disposed partially in the main roller 1061a through the opening region 1061O.

The plurality of coupling holes 1061H of the main roller 1061a are holes formed to couple the first auxiliary roller 1061b, the second auxiliary roller 1061c, and the third auxiliary roller 1061d to the main roller 1061a. The plurality of coupling holes 1061H may be disposed at two opposite ends of the main roller 1061a and formed adjacent to the first curved portion 1061R1 or the opening region 1061O. In this case, shortest straight distances from the plurality of coupling holes 1061H to an outer peripheral surface, i.e., the first curved portion 1061R1 of the main roller 1061a may be equal to one another as D1. For example, the shortest straight distance from the coupling hole 1061H, to which the first auxiliary roller 1061b is coupled, to the first curved portion 1061R1, the shortest straight distance from the coupling hole 1061H, to which the second auxiliary roller 1061c is coupled, to the first curved portion 1061R1, and the shortest straight distance from the coupling hole 1061H, to which the third auxiliary roller 1061d is coupled, to the first curved portion 1061R1 may be equal to one another as D1.

Further, the first auxiliary roller 1061b, the second auxiliary roller 1061c, and the third auxiliary roller 1061d may be coupled to the main roller 1061a as central shafts AX of the first auxiliary roller 1061b, the second auxiliary roller 1061c, and the third auxiliary roller 1061d are inserted into the plurality of coupling holes 1061H, respectively. Therefore, the roller 1061 may be easily and conveniently manufactured by coupling the central shafts AX of the plurality of auxiliary rollers 1061b, 1061c, and 1061d to the main roller 1061a. However, the main roller 1061a, the first auxiliary roller 1061b, the second auxiliary roller 1061c, and the third auxiliary roller 1061d may be coupled by other methods instead of the plurality of coupling holes 1061H. However, the present disclosure is not limited thereto.

Referring to FIG. 10B, the first auxiliary roller 1061b, the second auxiliary roller 1061c, and the third auxiliary roller 1061d are coupled to the main roller 1061a. The first auxiliary roller 1061b, the second auxiliary roller 1061c, and the third auxiliary roller 1061d are configured to support the display unit DP so that the display unit DP is wound with a larger radius of curvature in a region between the flat portion 1061F and the first curved portion 1061R1. The display unit DP may be wound while adjoining only a part of the first auxiliary roller 1061b, a part of the second auxiliary roller 1061c, and a part of the third auxiliary roller 1061d. Further, a trajectory, which is defined by a part of the first auxiliary roller 1061b, a part of the second auxiliary roller 1061c, and a part of the third auxiliary roller 1061d that adjoin the display unit DP, may be larger than a radius of curvature of the first auxiliary roller 1061b, a radius of curvature of the second auxiliary roller 1061c, and a radius of curvature of the third auxiliary roller 1061d. Therefore, a radius of curvature of the display unit DP wound along the trajectory around the first auxiliary roller 1061b, the second auxiliary roller 1061c, and the third auxiliary roller 1061d may be larger than the radius of curvature of the first auxiliary roller 1061b, the radius of curvature of the second auxiliary roller 1061c, and the radius of curvature of the third auxiliary roller 1061d. Therefore, the first auxiliary roller 1061b, the second auxiliary roller 1061c, and the third auxiliary roller 1061d may inhibit the display unit DP from being wound while being curved with a relatively small radius of curvature in the region between the first curved portion 1061R1 and the flat portion 1061F, particularly, at a part of the first curved portion 1061R1 adjacent to the flat portion 1061F, thereby minimizing the transmission of stress to the pad area of the display panel 120.

The first auxiliary roller 1061b is a roller configured to define a second curved portion 1061R2 and having the central shaft AX coupled to the two opposite ends of the main roller 1061a. An outer peripheral surface of the first auxiliary roller 1061b may correspond to the second curved portion 1061R2. A part of the first auxiliary roller 1061b may protrude to the outside of the first curved portion 1061R1 of the main roller 1061a and define the second curved portion 1061R2. The remaining portion of the first auxiliary roller 1061b may be disposed in the main roller 1061a through the opening region 1061O. Therefore, the main roller 1061a and the first auxiliary roller 1061b may serve as rollers that define the flat portion 1061F, first curved portion 1061R1, and the second curved portion 1061R2.

Among the plurality of auxiliary rollers 1061b, 1061c, and 1061d, the first auxiliary roller 1061b may be disposed to be closest to the flat portion 1061F of the main roller 1061a. For example, the first auxiliary roller 1061b and the main roller 1061a may be coupled to each other as the central shaft AX of the first auxiliary roller 1061b is inserted into the coupling holes 1061H which are disposed at the two opposite ends of the main roller 1061a and provided to be closest to the flat portion 1061F among the plurality of coupling holes 1061H.

The second auxiliary roller 1061c is a roller configured to define a third curved portion 1061R3 and having the central shaft AX coupled to the two opposite ends of the main roller 1061a. An outer peripheral surface of the second auxiliary roller 1061c may correspond to the third curved portion 1061R3. Apart of the second auxiliary roller 1061c may protrude to the outside of the first curved portion 1061R1 of the main roller 1061a and define the third curved portion 1061R3. The remaining part of the second auxiliary roller 1061c may be disposed in the main roller 1061a through the opening region 1061O. Therefore, the main roller 1061a, the first auxiliary roller 1061b, and the second auxiliary roller 1061c may serve as rollers that define the flat portion 1061F, the first curved portion 1061R1, the second curved portion 1061R2, and the third curved portion 1061R3.

The second auxiliary roller 1061c may be disposed adjacent to the first auxiliary roller 1061b. The first auxiliary roller 1061b may be disposed between the second auxiliary roller 1061c and the flat portion 1061F. For example, the second auxiliary roller 1061c and the main roller 1061a may be coupled to each other as the central shaft AX of the second auxiliary roller 1061c is inserted into the coupling holes 1061H which are disposed at the two opposite ends of the main roller 1061a and provided to be adjacent to the coupling holes 1061H to which the first auxiliary roller 1061b is coupled among the plurality of coupling holes 1061H.

The third auxiliary roller 1061d is a roller configured to define a fourth curved portion 1061R4 and having the central shaft AX coupled to the two opposite ends of the main roller 1061a. An outer peripheral surface of the third auxiliary roller 1061d may correspond to the fourth curved portion 1061R4. A part of the third auxiliary roller 1061d may protrude to the outside of the first curved portion 1061R1 of the main roller 1061a and define the fourth curved portion 1061R4. The remaining part of the third auxiliary roller 1061d may be disposed in the main roller 1061a through the opening region 1061O. Therefore, the main roller 1061a, the first auxiliary roller 1061b, the second auxiliary roller 1061c, and the third auxiliary roller 1061d may serve as rollers that define the flat portion 1061F, the first curved portion 1061R1, the second curved portion 1061R2, the third curved portion 1061R3, and the fourth curved portion 1061R4.

Among the plurality of auxiliary rollers 1061b, 1061c, and 1061d, the third auxiliary roller 1061d may be disposed to be farthest from the flat portion 1061F of the main roller 1061a. For example, the third auxiliary roller 1061d and the main roller 1061a may be coupled to each other as the central shaft AX of the third auxiliary roller 1061d is inserted into the coupling holes 1061H which are disposed at the two opposite ends of the main roller 1061a and provided to be farthest from the flat portion 1061F among the plurality of coupling holes 1061H.

Meanwhile, the radii of the plurality of auxiliary rollers 1061*b*, 1061*c*, and 1061*d* may increase as the distance from the flat portion 1061F decreases. For example, among the plurality of auxiliary rollers 1061*b*, 1061*c*, and 1061*d*, a first radius R1 of the first auxiliary roller 1061*b* closest to the flat portion 1061F may be largest, and a third radius R3 of the third auxiliary roller 1061*d* farthest from the flat portion 1061F may be smallest. Further, a second radius R2 of the second auxiliary roller 1061*c* disposed between the first auxiliary roller 1061*b* and the third auxiliary roller 1061*d* may have a value between the first radius R1 and the third radius R3.

In this case, the shortest straight distances from the plurality of coupling holes 1061H, to which the plurality of auxiliary rollers 1061*b*, 1061*c*, and 1061*d* are respectively coupled, to the outer peripheral surface of the main roller 1061*a* are equal to one another as D1. Further, the plurality of auxiliary rollers 1061*b*, 1061*c*, and 1061*d*, which are respectively coupled to the plurality of coupling holes 1061H and have different radii, may have different volumes of the portions protruding to the outside of the main roller 1061*a*. For example, the portion of the first auxiliary roller 1061*b* having the largest first radius R1, which protrudes to the outside of the main roller 1061*a*, may have the largest volume. The portion of the third auxiliary roller 1061*d* having the smallest third radius R3, which protrudes to the outside of the main roller 1061*a*, may have the smallest volume.

Meanwhile, FIGS. 10A to 11 illustrate that the first auxiliary roller 1061*b*, the second auxiliary roller 1061*c*, and the third auxiliary roller 1061*d* are used. However, only the first auxiliary roller 1061*b* may be used, or additional auxiliary rollers may be added. The number of auxiliary rollers 1061*b*, 1061*c*, and 1061*d* is not limited thereto.

In the display device 1000 according to the aspect of the present disclosure, the roller 1061 including the flat portion 1061F and the plurality of curved portions 1061R1, 1061R2, 1061R3, and 1061R4 may be implemented by coupling the main roller 1061*a* and the plurality of auxiliary rollers 1061*b*, 1061*c*, and 1061*d*. Specifically, a part of the first curved portion 1061R1 of the main roller 1061*a* including the flat portion 1061F and the first curved portion 1061R1 may be opened to form the opening region 1061O through which a vacant space in the main roller 1061*a* is exposed and to form the plurality of coupling holes 1061H at the two opposite ends of the main roller 1061*a*. Further, the auxiliary rollers 1061*b*, 1061*c*, and 1061*d* may be coupled to the main roller 1061*a* by inserting the central shafts AX of the plurality of auxiliary rollers 1061*b*, 1061*c*, and 1061*d* into the plurality of coupling holes 1061H. In this case, the plurality of auxiliary rollers 1061*b*, 1061*c*, and 1061*d* may be partially disposed outside the main roller 1061*a*, and the remaining portions of the plurality of auxiliary rollers 1061*b*, 1061*c*, and 1061*d* may be disposed in the main roller 1061*a* through the opening region 1061O. Further, the outer peripheral surfaces of the plurality of auxiliary rollers 1061*b*, 1061*c*, and 1061*d* disposed outside the main roller 1061*a* may define the second curved portion 1061R2, the third curved portion 1061R3, and the fourth curved portion 1061R4, respectively. Therefore, as the plurality of auxiliary rollers 1061*b*, 1061*c*, and 1061*d* are coupled to the main roller 1061*a*, the display panel 120 may be supported so that the display panel 120 may be wound while having a larger radius of curvature in the boundary area between the first curved portion 1061R1 and the flat portion 1061F. Therefore, in the display device 1000 according to the aspect of the present disclosure, the plurality of auxiliary rollers 1061*b*, 1061*c*, and 1061*d*, which have different radii, are coupled to the main roller 1061*a*. Therefore, it is possible to easily form the roller 161 including the flat portion 1061F and the plurality of curved portions 1061R1, 1061R2, 1061R3, and 1061R4.

Hereinafter, an effect of reducing stress to be applied to the display panel 120 during the winding process in the configurations in which the rollers 161, 861, and 1061 have the plurality of curved portions 161R1, 861R1, 1061R1, 161R2, 861R2, 1061R2, 861R3, 1061R3, 861R, and 1061R4 in the display devices 100, 800, and 1000 according to various aspects of the present disclosure will be described with reference to FIGS. 12A to 13B.

Figure 12A:
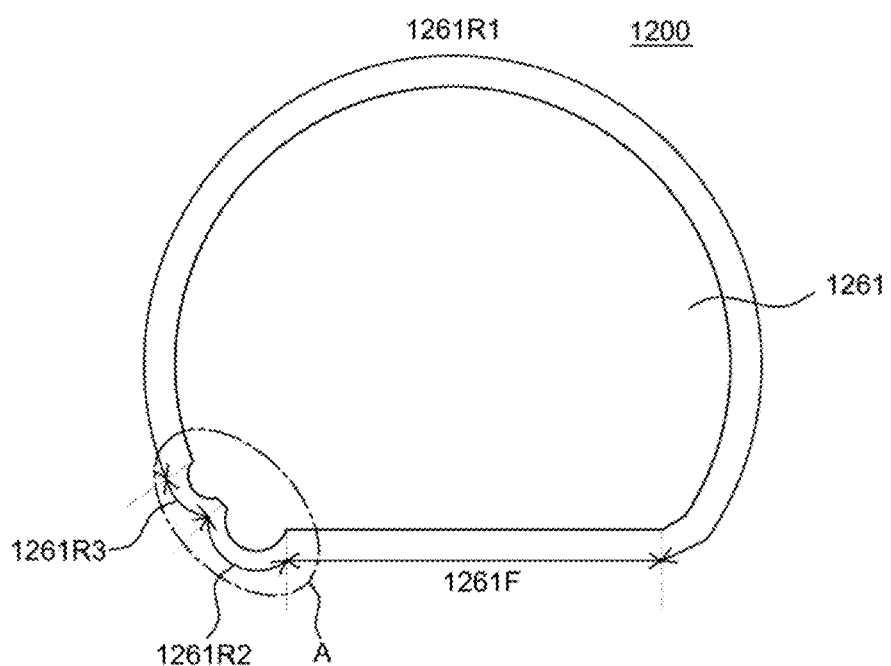
FIG. 12A is a schematic cross-sectional view of the roller of the display device according to the aspect.
Figure 12B:
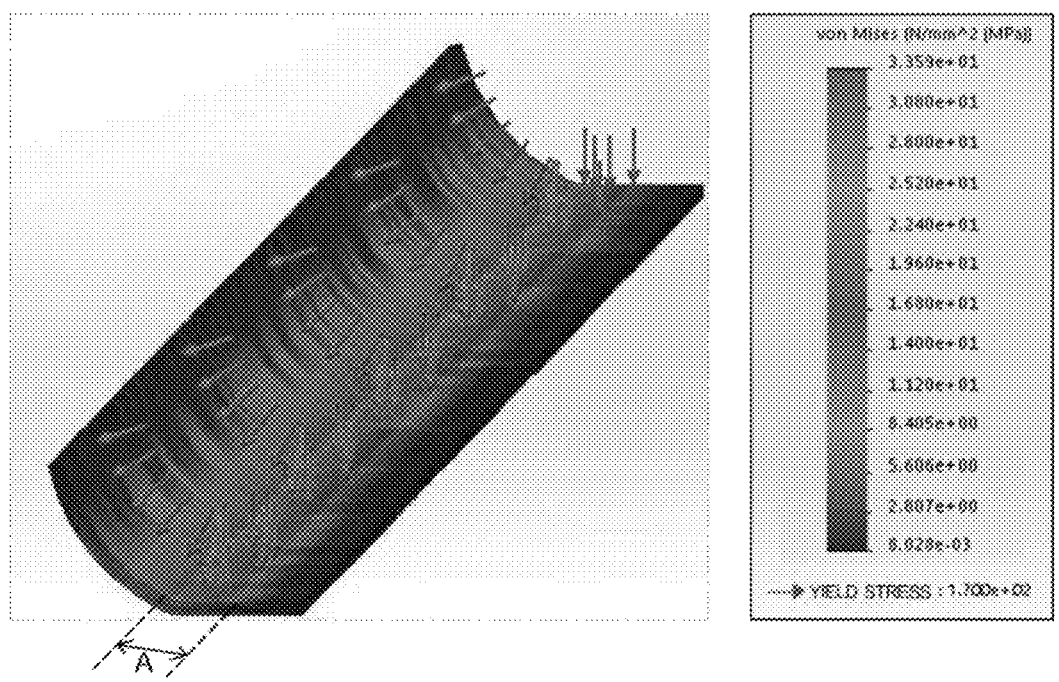
FIG. 12B is a view illustrating a distribution of stress applied to the display unit when the display unit of the display device according to the aspect is wound around the roller.
Figure 13A:
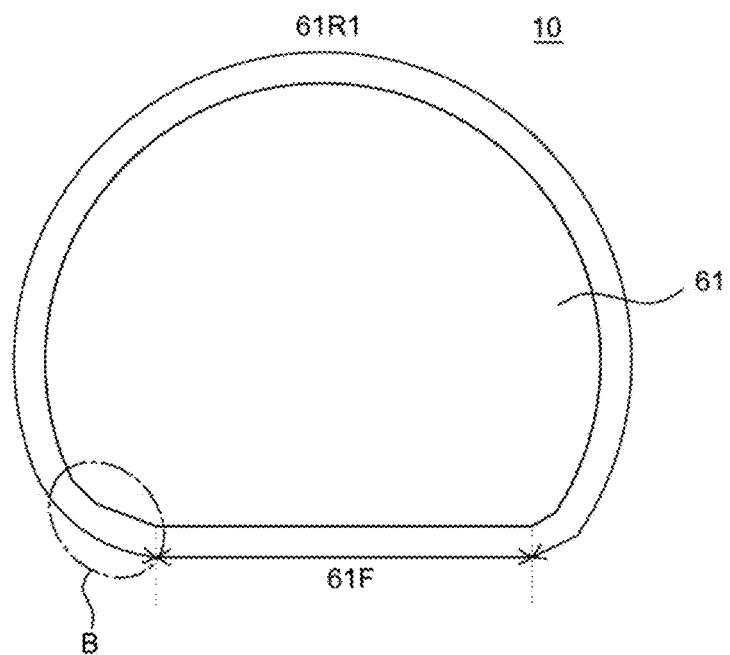
FIG. 13A is a schematic cross-sectional view of a roller of a display device according to a comparative example.
Figure 13B:
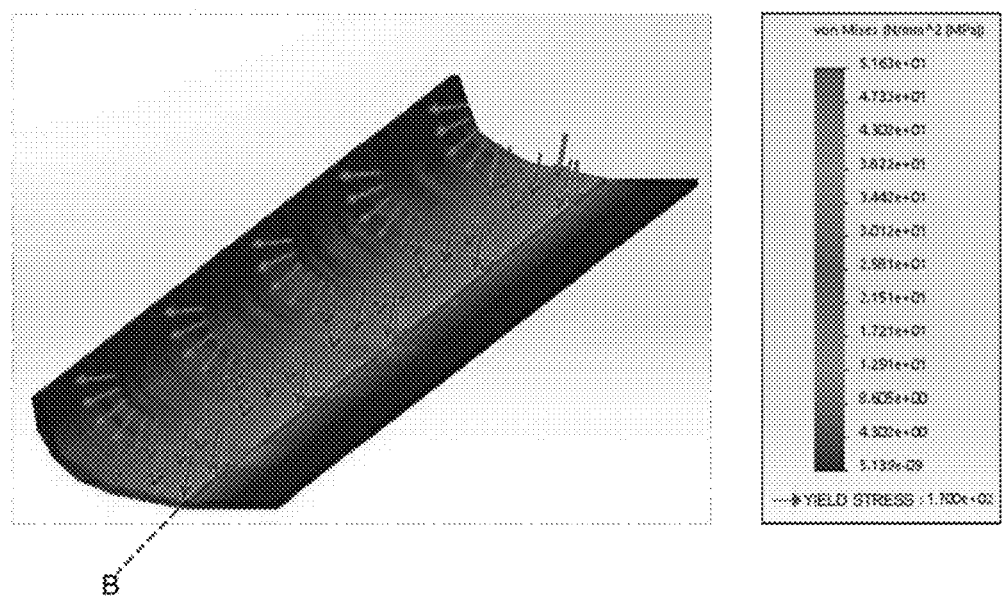
FIG. 13B is a view illustrating a distribution of stress applied to a display unit when the display unit of the display device according to the comparative example is wound around the roller.

FIG. 12A is a schematic cross-sectional view of the roller of the display device according to the aspect. FIG. 12B is a view illustrating a distribution of stress applied to the display unit when the display unit of the display device according to the aspect is wound around the roller. FIG. 13A is a schematic cross-sectional view of a roller of a display device according to a comparative example. FIG. 13B is a view illustrating a distribution of stress applied to a display unit when the display unit of the display device according to the comparative example is wound around the roller.

Referring to FIG. 12A, a roller 1261 of a display device 1200 according to an aspect includes a flat portion 1261F, a first curved portion 1261R1 extending from the flat portion 1261F, a second curved portion 1261R2 disposed between the first curved portion 1261R1 and the flat portion 1261F, and a third curved portion 1261R3 disposed between the second curved portion 1261R2 and the first curved portion 1261R1. A radius of curvature of the first curved portion 1261R1 is largest, and a radius of curvature of the third curved portion 1261R3 is smallest.

Referring to FIG. 13A, a roller 61 of a display device 10 according to a comparative example includes a flat portion 61F and a first curved portion 61R1. In comparison with the roller 1261 of the display device 1200 according to the aspect, the roller 61 of the display device 10 according to the comparative example includes only the first curved portion 61R1 but does not include a second curved portion 61R2 and a third curved portion 61R3.

Meanwhile, in FIGS. 12B and 13B, colors in respective regions indicate magnitudes of stress. A region close to a dark region has low stress, and a region close to a bright region has high stress.

Referring to FIG. 12A, when the display unit DP is wound around the roller 1261 of the display device 1200 according to the aspect, the display unit DP may be wound while being curved with a radius of curvature, which is larger than the radius of curvature of the second curved portion 1261R2 and the radius of curvature of the third curved portion 1261R3, by the second curved portion 1261R2 and the third curved portion 1261R3 in a boundary area between the first curved portion 1261R1 and the flat portion 1261F. The second curved portion 1261R2 and the third curved portion 1261R3 may support the display unit DP so that the display unit DP has a large radius of curvature in the boundary area A between the first curved portion 1261R1 and the flat portion 1261F.

Referring to FIG. 12B, in the distribution of stress applied to the display unit DP, the stress applied to the boundary area A is about 33 MPa. It can be seen that relatively low stress is applied to the region corresponding to the flat portion 1261F and the first curved portion 1261R1 because the display unit DP is wound around the flat portion 1261F and the first curved portion 1261R1 while having a relatively large radius of curvature. Therefore, it can be seen that the stress of about 33 MPa is widely distributed in the boundary area A corresponding to the second curved portion 1261R2 and the third curved portion 1261R3.

Referring to FIG. 13A, when the display unit DP is wound around the roller 61 of the display device 10 according to the comparative example, the display unit DP may be wound while being curved with a radius of curvature smaller than a radius of curvature of the first curved portion 61R1 in a boundary area B between the first curved portion 61R1 and the flat portion 61F. The boundary area B between the flat portion 61F and the first curved portion 61R1 may be a region bent with a radius of curvature smaller than the radius of curvature of the first curved portion 61R1. Therefore, the display unit DP may be curved with a radius of curvature smaller than the radius of curvature of the first curved portion 61R1 in the boundary area B.

Referring to FIG. 13B, in the distribution of stress applied to the display unit DP, the stress applied to the boundary area B is about 51 MPa. Even in the case of the display device 10 according to the comparative example, relatively low stress is applied to a partial region of the display unit DP wound around the flat portion 61F and the first curved portion 61R1. However, the stress of 51 MPa is concentrated in a very local area of the boundary area B between the first curved portion 61R1 and the flat portion 61F. In this case, there is a high likelihood that the display unit DP is damaged by the stress of 51 MPa concentrated in the partial region of the display unit DP during the process of repeatedly winding and unwinding the display unit DP.

In summary, in the display device 1200 according to the aspect, the second curved portion 1261R2 and the third curved portion 1261R3 are formed between the first curved portion 1261R1 and the flat portion 1261F, such that relatively low stress is dispersed to the wide region of the display unit DP in the boundary area A. In the display device 10 according to the comparative example, relatively high stress may be locally applied to the display unit DP in the boundary area B between the first curved portion 61R1 and the flat portion 61F. Therefore, in comparison with the display device 10 according to the comparative example, it can be seen that the roller 1261 of the display device 1200 according to the aspect further includes the second curved portion 1261R2 and the third curved portion 1261R3, such that the stress applied to the boundary area A may be reduced by about 35%, and the stress is applied to a relatively wide region without being concentrated only in a partial region.

Therefore, in the display device 1200 according to the aspect, the second curved portion 1261R2 and the third curved portion 1261R3 may be further formed in the boundary area A between the first curved portion 1261R1 and the flat portion 1261F in order to support the display unit DP so that the display unit DP may be wound with a large radius of curvature, and the stress may not be concentrated in the partial region of the display unit DP. Since the second curved portion 1261R2 and the third curved portion 1261R3 support the display unit DP in the boundary area A, it is possible to reduce the stress applied to the display unit DP, particularly, the stress applied to the partial region of the display panel 120 adjacent to the pad area. Further, since the stress is distributed to a relatively wide region in the boundary area A, it is possible to minimize defects such as cracks occurring in the pad area of the display unit DP, in comparison with the display device 10 according to the comparative example in which stress is concentrated in a particular region. Therefore, like the roller 1261 of the display device 1200 according to the aspect, the rollers 161, 861, and 1061 of the display devices 100, 800, and 1000 according to various aspects of the present disclosure further include one or more curved portions 161R2, 861R2, 1061R2, 861R3, 1061R3, 861R, and 1061R4 disposed between the first curved portion 1261R1 and the flat portions 161F, 861F, and 1061F. Therefore, it is possible to minimize cracks or defects caused by the concentration of stress in a particular region of the display unit DP during the winding process and to improve reliability of the display devices 100, 800, and 1000.

The exemplary aspects of the present disclosure can also be described as follows:

According to an aspect of the present disclosure, there is provided a display device. The display device includes a display unit, and a roller configured such that the display unit is wound around or unwound from the roller, the roller comprising a flat portion, a first curved portion extending from the flat portion, and a second curved portion extending from the first curved portion toward the flat portion. A radius of curvature of the first curved portion is larger than a radius of curvature of the second curved portion, and a radius of curvature of the display unit wound around the second curved portion is larger than the radius of curvature of the second curved portion.

The display unit may adjoin only a part of the second curved portion when the display unit is wound.

The roller may further comprise a third curved portion disposed between the second curved portion and the first curved portion, and a radius of curvature of the third curved portion may be smaller than the radius of curvature of the second curved portion.

The roller may include a main roller having an outer peripheral surface including the first curved portion and the flat portion, the main roller comprising an opening region formed by opening a part of the first curved portion, and a first auxiliary roller disposed in the opening region and having an outer peripheral surface corresponding to the second curved portion, and a central shaft of the first auxiliary roller may be coupled to two opposite ends of the main roller.

In the opening region, a part of the first auxiliary roller may be disposed inside the main roller, and the remaining part of the first auxiliary roller may be disposed outside the main roller and defines the second curved portion.

The roller may further comprise a second auxiliary roller configured to define a third curved portion between the first curved portion and the second curved portion and having a central shaft coupled to the two opposite ends of the main roller, and in the opening region, a part of the second auxiliary roller may be disposed inside the main roller, and the remaining part of the second auxiliary roller may be disposed outside the main roller and defines the third curved portion.

A shortest straight distance from the central shaft of the first auxiliary roller to the first curved portion may be equal to a shortest straight distance from the central shaft of the second auxiliary roller to the first curved portion.

A radius of the first auxiliary roller may be larger than a radius of the second auxiliary roller.

The display unit may comprise a display panel, a first cover configured to support a rear surface of the display panel, and a bottom cover configured to support one end of the display panel and one end of the first cover, and one surface of the bottom cover may be disposed on the same plane as a tangential plane of the second curved portion.

According to another aspect of the present disclosure, there is provided a display device. The display device includes a display panel, and a roller configured such that the display panel is wound around or unwound from the roller, the roller comprising a flat portion, a first curved portion, and a second curved portion disposed between the first curved portion and the flat portion and having a smaller radius of curvature than the first curved portion. A part of the second curved portion further protrudes outward than one surface of the flat portion.

The roller may further comprise a third curved portion disposed between the first curved portion and the second curved portion, and a radius of curvature of the display panel wound around the second curved portion and the third curved portion may be larger than a radius of curvature of the second curved portion and a radius of curvature of the third curved portion.

The radius of curvature of the second curved portion may be larger than the radius of curvature of the third curved portion, and a surface area of the second curved portion may be larger than a surface area of the third curved portion.

The roller may comprise a main roller having an outer peripheral surface including the first curved portion and the flat portion, the main roller having a plurality of coupling holes disposed at two opposite ends thereof, and a first auxiliary roller having a central shaft coupled to the plurality of coupling holes, and a part of the first auxiliary roller may be disposed outside the main roller and defines the second curved portion, and the remaining part of the first auxiliary roller may be disposed inside the main roller.

The roller may further comprise a second auxiliary roller having a central shaft coupled to the plurality of coupling holes of the main roller, and a part of the second auxiliary roller may be disposed outside the main roller and may define a third curved portion between the first curved portion and the second curved portion, and the remaining part of the second auxiliary roller may be disposed inside the main roller.

The first auxiliary roller may be closer to the flat portion than the second auxiliary roller, and a radius of the first auxiliary roller may be larger than a radius of the second auxiliary roller.

A volume of a part of the first auxiliary roller disposed outside the main roller may be larger than a volume of a part of the second auxiliary roller disposed outside the main roller.

Shortest straight distances from the plurality of coupling holes to the outer peripheral surface of the main roller may be equal to one another.

The display device may further include a plurality of flexible films connected to one end of the display panel, a printed circuit board connected to one end of the plurality of flexible films, and a bottom cover configured to support the printed circuit board and one end of the display panel in a flat state when the display panel is wound. An imaginary plane extending from one surface of the bottom cover may adjoin the second curved portion.

Although the exemplary aspects of the present disclosure have been described in detail with reference to the accompanying drawings, the present disclosure is not limited thereto and may be embodied in many different forms without departing from the technical concept of the present disclosure. Therefore, the exemplary aspects of the present disclosure are provided for illustrative purposes only but not intended to limit the technical concept of the present disclosure. The scope of the technical concept of the present disclosure is not limited thereto. Therefore, it should be understood that the above-described exemplary aspects are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A display device comprising:
    a display unit; and
    a roller configured to wind or unwind the display unit and comprising a flat portion, a first curved portion extending from the flat portion, and a second curved portion extending from the first curved portion toward the flat portion,
    wherein a radius of curvature of the first curved portion is larger than a radius of curvature of the second curved portion, and a radius of curvature of the display unit wound around the second curved portion is larger than the radius of curvature of the second curved portion,
    wherein the roller comprises:
    a main roller having an outer peripheral surface including the first curved portion and the flat portion, the main roller comprising an opening region formed by opening a part of the first curved portion; and
    a first auxiliary roller disposed in the opening region and having an outer peripheral surface corresponding to the second curved portion, and
    wherein a central shaft of the first auxiliary roller is coupled to two opposite ends of the main roller.

2. The display device of claim 1, wherein the display unit adjoins only a part of the second curved portion when the display unit is wound.

3. The display device of claim 1, wherein the roller further comprises a third curved portion disposed between the second curved portion and the first curved portion, and a radius of curvature of the third curved portion is smaller than the radius of curvature of the second curved portion.

4. The display device of claim 1, wherein, in the opening region, a part of the first auxiliary roller is disposed inside the main roller, and a remaining part of the first auxiliary roller is disposed outside the main roller and defines the second curved portion.

5. The display device of claim 1, wherein the roller further comprises a second auxiliary roller configured to define a third curved portion between the first curved portion and the second curved portion and having a central shaft coupled to the two opposite ends of the main roller, and
    wherein, in the opening region, a part of the second auxiliary roller is disposed inside the main roller, and a remaining part of the second auxiliary roller is disposed outside the main roller and defines the third curved portion.

6. The display device of claim 5, wherein a shortest straight distance from the central shaft of the first auxiliary roller to the first curved portion is equal to a shortest straight distance from the central shaft of the second auxiliary roller to the first curved portion.

7. The display device of claim 6, wherein a radius of the first auxiliary roller is larger than a radius of the second auxiliary roller.

8. The display device of claim 1, wherein the display unit comprises:
    a display panel;
    a first cover configured to support a rear surface of the display panel; and
    a bottom cover configured to support one end of the display panel and one end of the first cover, and
    wherein one surface of the bottom cover is disposed on a same plane as a tangential plane of the second curved portion.

9. A display device comprising:
a display panel; and
a roller configured to wind or unwind the display panel, and comprising a flat portion, a first curved portion, and a second curved portion disposed between the first curved portion and the flat portion and having a smaller radius of curvature than the first curved portion,
wherein a part of the second curved portion further protrudes outward than one surface of the flat portion,
wherein the roller comprises:
a main roller having an outer peripheral surface including the first curved portion and the flat portion, the main roller having a plurality of coupling holes disposed at two opposite ends thereof; and
a first auxiliary roller having a central shaft coupled to the plurality of coupling holes, and
wherein a part of the first auxiliary roller is disposed outside the main roller and defines the second curved portion, and the remaining part of the first auxiliary roller is disposed inside the main roller.

10. The display device of claim 9, wherein the roller further comprises a third curved portion disposed between the first curved portion and the second curved portion, and
wherein a radius of curvature of the display panel wound around the second curved portion and the third curved portion is larger than a radius of curvature of the second curved portion and a radius of curvature of the third curved portion.

11. The display device of claim 10, wherein the radius of curvature of the second curved portion is larger than the radius of curvature of the third curved portion, and a surface area of the second curved portion is larger than a surface area of the third curved portion.

12. The display device of claim 9, wherein the roller further comprises a second auxiliary roller having a central shaft coupled to the plurality of coupling holes of the main roller, and
wherein a part of the second auxiliary roller is disposed outside the main roller and defines a third curved portion between the first curved portion and the second curved portion, and the remaining part of the second auxiliary roller is disposed inside the main roller.

13. The display device of claim 12, wherein the first auxiliary roller is closer to the flat portion than the second auxiliary roller, and a radius of the first auxiliary roller is larger than a radius of the second auxiliary roller.

14. The display device of claim 13, wherein a volume of a part of the first auxiliary roller disposed outside the main roller is larger than a volume of a part of the second auxiliary roller disposed outside the main roller.

15. The display device of claim 13, wherein shortest straight distances from the plurality of coupling holes to the outer peripheral surface of the main roller are equal to one another.

16. The display device of claim 9, further comprising:
a plurality of flexible films connected to one end of the display panel;
a printed circuit board connected to one end of the plurality of flexible films; and
a bottom cover configured to support the printed circuit board and one end of the display panel in a flat state when the display panel is wound,
wherein an imaginary plane extending from one surface of the bottom cover adjoins the second curved portion.

* * * * *